(12) United States Patent
Luo et al.

(10) Patent No.: US 11,396,995 B2
(45) Date of Patent: Jul. 26, 2022

(54) PANEL LIGHT APPARATUS

(71) Applicant: XIAMEN LEEDARSON LIGHTING CO.LTD, Fujian (CN)

(72) Inventors: Tong Luo, Fujian (CN); Zhiyong Jiang, Fujian (CN)

(73) Assignee: XIAMEN LEEDARSON LIGHTING CO., LTD, Fujian (CN)

(*) Notice: Subject to any disclaimer, the term of this patent is extended or adjusted under 35 U.S.C. 154(b) by 0 days.

(21) Appl. No.: 16/932,131

(22) Filed: Jul. 17, 2020

(65) Prior Publication Data
US 2022/0018517 A1    Jan. 20, 2022

(51) Int. Cl.
| | |
|---|---|
| F21V 7/04 | (2006.01) |
| F21V 5/00 | (2018.01) |
| F21V 3/00 | (2015.01) |
| F21V 23/00 | (2015.01) |
| F21V 9/08 | (2018.01) |
| F21S 4/28 | (2016.01) |
| F21V 23/04 | (2006.01) |
| F21Y 103/10 | (2016.01) |
| F21Y 115/10 | (2016.01) |

(52) U.S. Cl.
CPC .......... *F21V 7/04* (2013.01); *F21S 4/28* (2016.01); *F21V 3/00* (2013.01); *F21V 5/007* (2013.01); *F21V 9/08* (2013.01); *F21V 23/009* (2013.01); *F21V 23/04* (2013.01); *F21Y 2103/10* (2016.08); *F21Y 2115/10* (2016.08)

(58) Field of Classification Search
CPC ... F21V 7/04; F21V 3/00; F21V 5/007; F21V 9/08; F21V 23/009; F21V 23/04; F21S 4/28
See application file for complete search history.

(56) References Cited

U.S. PATENT DOCUMENTS 3,384,888 A * 5/1968 Harnden, Jr. .......... G04G 9/102
345/56

FOREIGN PATENT DOCUMENTS

| CN | 102725578 A | * | 10/2012 | ....... G02F 1/133605 |
|---|---|---|---|---|
| CN | 106015972 A | * | 10/2016 | |
| CN | 206001279 U | * | 3/2017 | |
| CN | 109961706 A | * | 7/2019 | |
| CN | 209309714 U | * | 8/2019 | |
| CN | 110242873 A | * | 9/2019 | |
| CN | 211738669 U | * | 10/2020 | |

* cited by examiner

*Primary Examiner* — Mary Ellen Bowman
(74) *Attorney, Agent, or Firm* — Chun-Ming Shih; Lanway IPR Services

(57) ABSTRACT

The back plate has four lateral walls and a bottom plate. A back side of the bottom plate includes multiple sets of folding hooks. Each set corresponds a different installation platform. One of the multiple sets of folding hooks is folded to be used for hooking to a corresponding installation platform. The light source module has multiple LED modules disposed on the bottom plate. Each LED module has a LED device and a lens. The lens diffuses a light of the LED device to be evenly emitted from the lens and broadening an output angle of the light via the lens. The diffusion plate with a peripheral edge is fixed to the four lateral walls of the back plate. The driver cover is attached to an external side of one of the four walls of the back plate. The driver cover defines a container cavity for concealing the driver module.

17 Claims, 25 Drawing Sheets

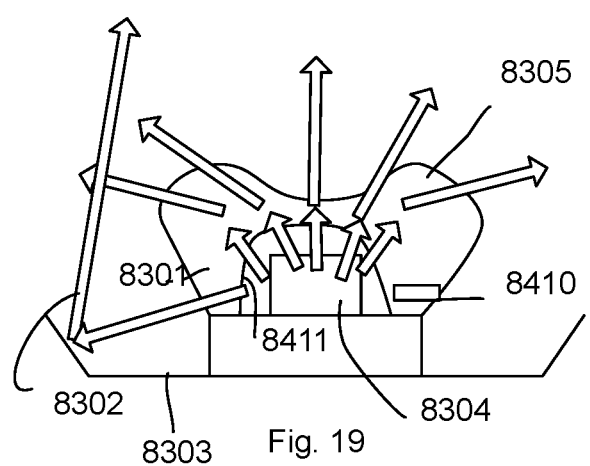

PANEL LIGHT APPARATUS

FIELD

The present application is related to a panel light apparatus and more particularly related to a LED panel light apparatus.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

Panel light devices are widely used in various environments. The thickness of panel light devices is attractive. Therefore, it is a great challenge to design a flexible panel light device with great functions.

SUMMARY

In some embodiments, a panel light apparatus includes a back plate, multiple light source modules and a light passing cover.

The back plate has a flat area and multiple concave areas. The concave areas help increase strength for anti-deforming of the back plate. This is particularly helpful when the back plate has a size larger than 60 cm square.

The multiple light source modules are disposed on the bottom plate. Each light source module includes multiple LED modules. Each LED module includes multiple LED devices and multiple corresponding lens. Each LED device is covered by one corresponding lens. The light passing cover is connected to the back plate for enclosing and protecting the light source modules. The lens may diffuse the light of the LED module or condense the light of the LED module. For the former case, the light is evenly projected on the light passing cover. For the latter case, the light is focused as light beams to be transmitted with a condensed intensity to certain projected area.

In some embodiments, when there are multiple light source modules disposed at different areas of the panel light apparatus, the lens for different light source modules may be designed with different directing parameters. For example, the lens for light source modules on a peripheral area, compared with the lens in the middle area, help diverges the light of the light source module to a wider area to more evenly projecting light on a luminance area.

In some embodiments, the back plate has four lateral walls and a bottom plate. An internal surface of the lateral wall has an obtuse angle against an inner surface of the bottom plate.

In some embodiments, the light passing cover is a diffusion plate. A peripheral edge of the diffusion plate is enclosed by a frame. The frame clips the diffusion plate between the frame and the back plate.

In some embodiments, the panel light apparatus may also include a driver box disposed on a L shape area of a back side of the frame and an exterior side of the lateral wall. The L shape area has an obtuse angle.

In some embodiments, there is a manual switch disposed on a front side of the frame for a user to operate the manual switch for adjusting a setting of the light source module.

In some embodiments, the manual switch is selected to adjust an intensity of the light source module for fitting to different emergency needs of time.

In some embodiments, an antenna unit is disposed on a front side of the frame, an electrode of the antenna unit is provided for connecting to a wireless circuit.

In some embodiments, each concave area is disposed with one corresponding light source. There are multiple light passing covers separately connected to the back plate for forming multiple container spaces.

In some embodiments, the light source module is an elongated shape light bar. The concave area is an elongated concave area.

In some embodiments, the lights source module is disposed at a bottom position of the concave area. Two side walls of the concave areas reflect a light of the light source to the light passing cover.

In some embodiments, the multiple light sources are working separately. When one of the multiple light sources is damaged, the other light sources are still working normally.

In some embodiments, the concave area has a plugging unit for the light source module to plug for a structure and an electrical connection.

In some embodiments, the light source module is a standard light tube.

In some embodiments, the light passing cover has an outwardly curved surface forming a light passing dome for expanding a luminance area.

In some embodiments, the lens has an exterior surface and an internal surface, a top part of the exterior surface has a central concave portion and a convex ring portion surrounding the central concave portion. The internal surface conceals an LED IC of the LED device preventing contact with environment air, and there is a heat dissipation air in the concealed space for protecting the LED IC.

In some embodiments, a panel light apparatus including a back plate, a light source module, a diffusion plate, a driver module and a driver cover.

The back plate has four lateral walls and a bottom plate. A back side of the bottom plate includes multiple sets of folding hooks. Each set corresponds a different installation platform. One of the multiple sets of folding hooks is folded to be used for hooking to a corresponding installation platform.

The bottom plate has a metal layer and reflective layer. In some embodiments, the reflective layer is a PET thin film.

In some embodiments, the PET thin film and the metal layer are connected via a heating procedure and then are stamped for forming the four lateral walls and the bottom plate.

In some embodiments, a scrollable film is manually added above the diffusion plate.

In some embodiments, the diffusion plate has a detachable diffusion film, the detachable diffusion film is replaceable with another detachable diffusion film to provide different light output effect.

In some embodiments, the diffusion plate is detachable from the back plate to be replaced with another diffusion plate of a different optical parameter.

In some embodiments, the LED modules are divided into multiple LED sets, when one LED set is damaged, an adjacent LED set is activated to replace the damaged LED set.

In some embodiments, a driver circuit is concealed by the back plate and the diffusion plate.

In some embodiments, a manual switch is used for replacing a damaged driver part with a non-damaged driver part.

In some embodiments, the driver cover has a module slot for inserting a function module.

In some embodiments, the multiple LED modules are divided into different tilt groups with different emitting angles with respect to the diffusion plate to evenly produce an even light on the diffusion plate.

The light source module has multiple LED modules disposed on the bottom plate. Each LED module has a LED device and a lens. The lens diffuses a light of the LED device to be evenly emitted from the lens and broadening an output angle of the light via the lens.

The diffusion plate with a peripheral edge is fixed to the four lateral walls of the back plate. The driver cover is attached to an external side of one of the four walls of the back plate. The driver cover defines a container cavity for concealing the driver module. The driver cover has a driver opening for exposing the driver to manually adjusting the driver module.

In some embodiments, the driver opening is covered by a movable driver concealing plate. The movable driver concealing plate is moved to expose the driver module to be manually adjusted.

In some embodiments, the wire terminal having a tilt receiver side with a tilt angle with respect to the driver circuit board. The wire terminal includes an insulation body, a receiver socket and an electrode. The receiver socket has a tilt angle between 10 degrees to 80 degrees with respect to the driver circuit board. The receiver socket is used for connecting to a wire plug for electrically transmitting an external power to the driver circuit board via the electrode and the driver wire.

In some embodiments, the driver cover includes a detachable top cover having two top side walls to engages two bottom side walls of the driver cover to define the container cavity. The example that includes a top housing and a bottom housing that are detachably connected for creating the driver cover mentioned in this disclosure support such embodiment.

In some embodiments, the driver cover includes a support plate for mounting a driver circuit board of the driver module. The support plate holds the driver circuit board to keep a distance to a bottom surface, e.g. an exterior surface of the back plate, thus reserve an air passing tunnel for air to flow through.

In some embodiments, a heat dissipation channel is below the support plate and the back plate for air flowing carrying away heat of the driver module.

In some embodiments, the driver cover has a heat dissipation opening for air to pass through for carrying away heat of the driver module. This further enhances the feature when air carrying heat may be moved outside the driver cover.

In some embodiments, the bottom plate has multiple curved reflective areas respectively facing toward the multiple LED modules for reflecting the light of the multiple LED modules toward the diffusion plate.

Specifically, in some embodiments, the LED modules mainly rely on diffusion refraction of the lens covered over its LED device. The inner surface of the back plate, particularly when being attached with a reflective layer or a reflective coating, also helps on reflecting a portion of light to the diffusion plate.

In some other embodiments, the concave and convex shapes of the reflective layer surrounding the LED module may be designed particularly for the light paths of the LED modules to more efficiently reflecting to the diffusion layer.

When the panel light apparatus has a larger size, it would be expensive to attach a reflective layer on every position of the back plate. To optimize the balance between cost and light efficiency, areas that reflect more portion, e.g. where more than 70% of light reflection occurs, are attached with reflection strips.

In some embodiments, the multiple LED modules are divided into multiple LED strips respectively disposed in concave grooves of the bottom plate.

In some embodiments, the bottom plate has another convex groove for placing the driver module.

In some embodiments, the LED strip has a LED circuit board mounted with a portion of the LED modules, the width of the LED circuit board is smaller than a diameter of the lens.

In some embodiments, the lens directing a portion of a light of the LED modules to be reflected by the bottom plate to the diffusion plate.

In some embodiments, the lens has a reflection part for reflecting a portion of the light of the LED module to the bottom plate and then to the diffusion plate.

In some embodiments, the lens has a positioning part for aligning and attaching to a LED circuit board mounted with the LED modules.

In some embodiments, the lens has an exterior surface and an internal surface, a top part of the exterior surface has a central concave portion and a convex ring portion surrounding the central concave portion.

In some embodiments, the internal surface of the lens has a dorm shape surrounding the LED device.

In some embodiments, there is an air gap between the lens and the LED device for preventing heat accumulated between the LED device and the lens.

In some embodiments, the lens has an anti-blue-light layer for decreasing high frequency light emitting from the diffusion plate.

In some embodiments, each LED device has multiple LED dies with different optical parameters.

In some embodiments, a battery is placed aside an external side of one lateral wall for providing an emergent current to the LED modules. The emergent current is smaller than a normal driving current provided to the LED modules.

In some embodiments, the panel light apparatus may also include a frame surrounding the back cover. There is a manual switch disposed on the frame to configure a setting of the driver module.

In some embodiments, the manual switch is used for changing an optical parameter for controlling the LED modules.

In some embodiments, the panel light apparatus may also include a frame surrounding the back cover. There is a foam between a connection of the frame and the diffusion plate.

In some embodiments, the panel light apparatus may also include a frame with a function slot for mounting a function module connecting to the driver module.

In some embodiments, the panel light apparatus may also include an indicator for transmitting a light message on the diffusion plate.

In some embodiments, the panel light apparatus may also include a beam LED module having a condensing lens for emitting a light beam on the diffusion plate for showing a light message controlled by the driver module.

In some embodiments, the LED modules are divided into multiple LED sets, when one LED set is damaged, an adjacent LED set is activated to replace the damaged LED set.

In some embodiments, the driver module has a first driver part and a second driver part, when one of the first driver part and the second driver part is damaged, the other of the first driver part and the second driver part is activated.

In some embodiments, the multiple LED modules are divided and placed on multiple LED strips disposed in parallel.

In some embodiments, a conductive path is placed away from peripheral edge of the bottom plate with a distance from the peripheral edge of more than 10% of a width of the bottom plate. The conductive path is used for electrically connecting the multiple LED strips to the driver module.

In some embodiments, the conductive path has a plugging structure for connecting the multiple LED strips.

In some embodiments, the LED modules are divided into groups to be controlled by the driver module separately to produce different light areas as requested by a user.

In some embodiments, the LED module has multiple LED devices integrated on a package. The multiple LED devices on the package are positioned to have different angles for emitting multiple lights from the package.

In some embodiments, the multiple lights of the multiple LED devices for different angles have different light intensities.

In some embodiments, the light intensities are adjusted by the driver module to provide an overall even output on the diffusion layer.

In some embodiments, an external device captures an output light pattern appeared on the diffusion plate and sends a message related to the captured output light pattern to the driver module to adjust the intensities of the multiple LED devices in the package.

In some embodiments, the driver cover is made of metal material.

In some embodiments, the driver cover and an exterior surface of one lateral wall of the back plate together form the container cavity for concealing the driver module.

In some embodiments, the driver cover has multiple sections. A first section of the multiple sections is used for containing the driver module. A second section of the multiple sections is used for connecting a first wire. There is a separator between the first section and the second section.

In some embodiments, a third section of the multiple sections is used for connecting a second wire. A voltage passing the first wire is larger than a voltage passing the second wire.

In some embodiments, the multiple sets of folding hooks are fit to a surface of the back plate.

In some embodiments, one of the multiple sets of folding hooks are located at four corners of the back plate.

In some embodiments, a connection edge between the four lateral walls and the bottom plate has a curved reflective area for reflecting the light of the LED modules toward the diffusion plate.

In some embodiments, the bottom plate has a metal layer and reflective layer. The reflective layer of the bottom plate help reflecting a light of the multiple LED modules emitting on the reflective layer of the bottom plate.

In some embodiments, the bottom plate has multiple curved reflective areas respectively facing toward the multiple LED modules for reflecting the light of the multiple LED modules toward the diffusion plate.

In some embodiments, the driver module has a first driver part and a second driver part. When one of the first driver part and the second driver part is damaged, the other of the first driver part and the second driver part is activated.

In some embodiments, the LED modules are divided into groups to be controlled by the driver module separately to produce different light areas as requested by a user.

In some embodiments, the groups correspond to luminance areas of different dimensions.

BRIEF DESCRIPTION OF DRAWINGS

FIG. 19 shows a lens example.

DETAILED DESCRIPTION

Figure 25:
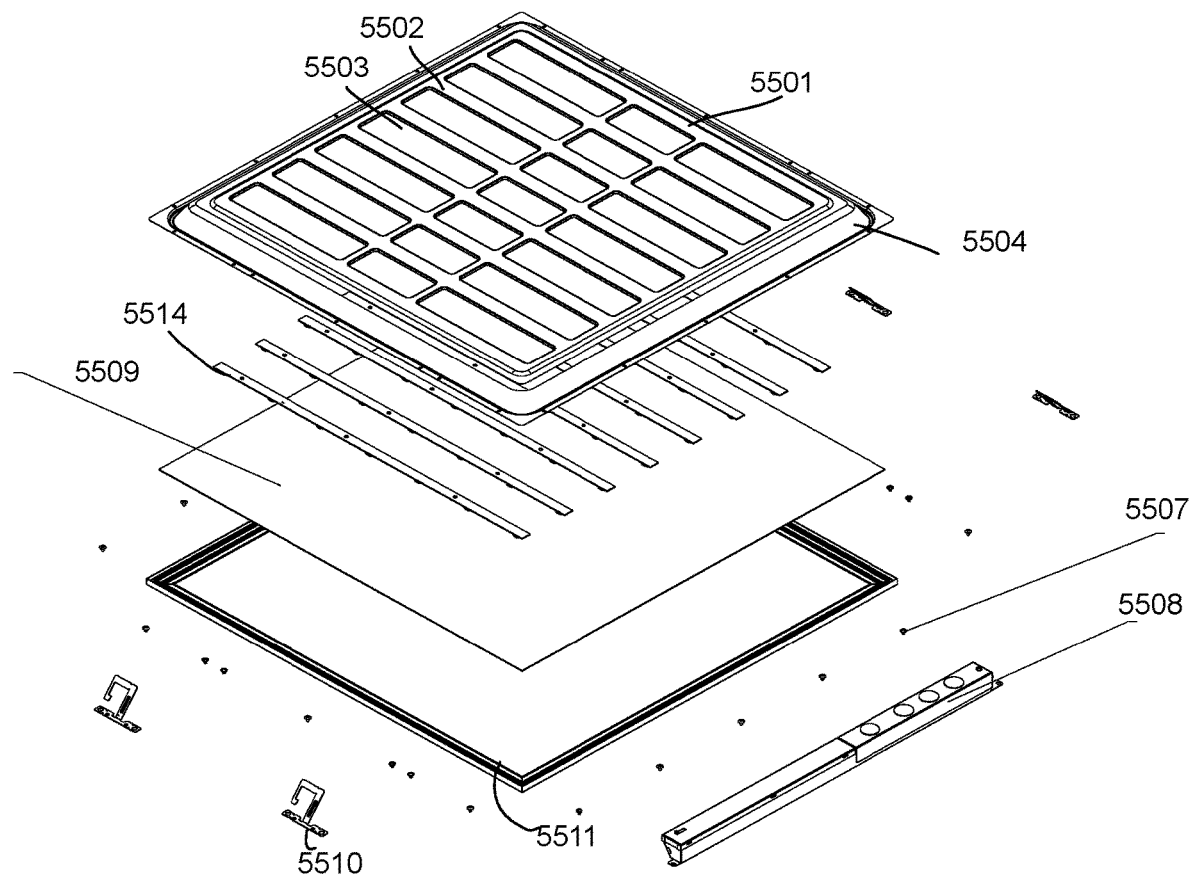
FIG. 25 shows another panel light apparatus example.
Figure 26A:
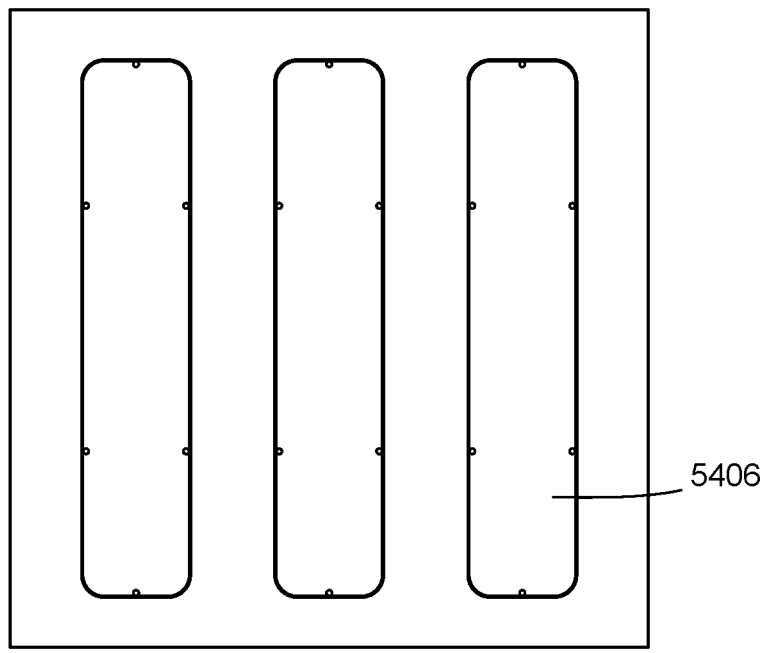
FIG. 26A, FIG. 26B, FIG. 26C and FIG. 27 show different views of another panel light embodiment.
Figure 26B:
Figure 26C:
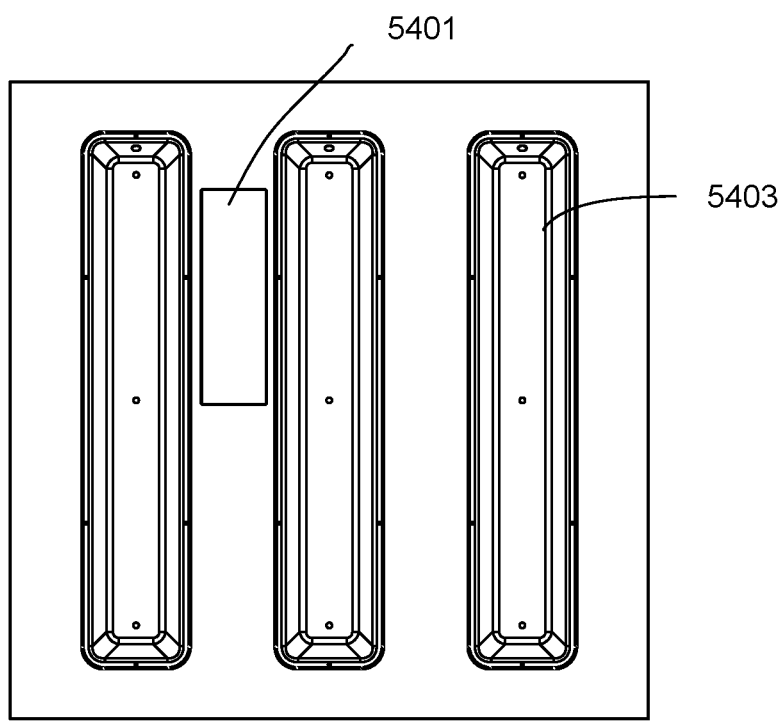
Figure 27:
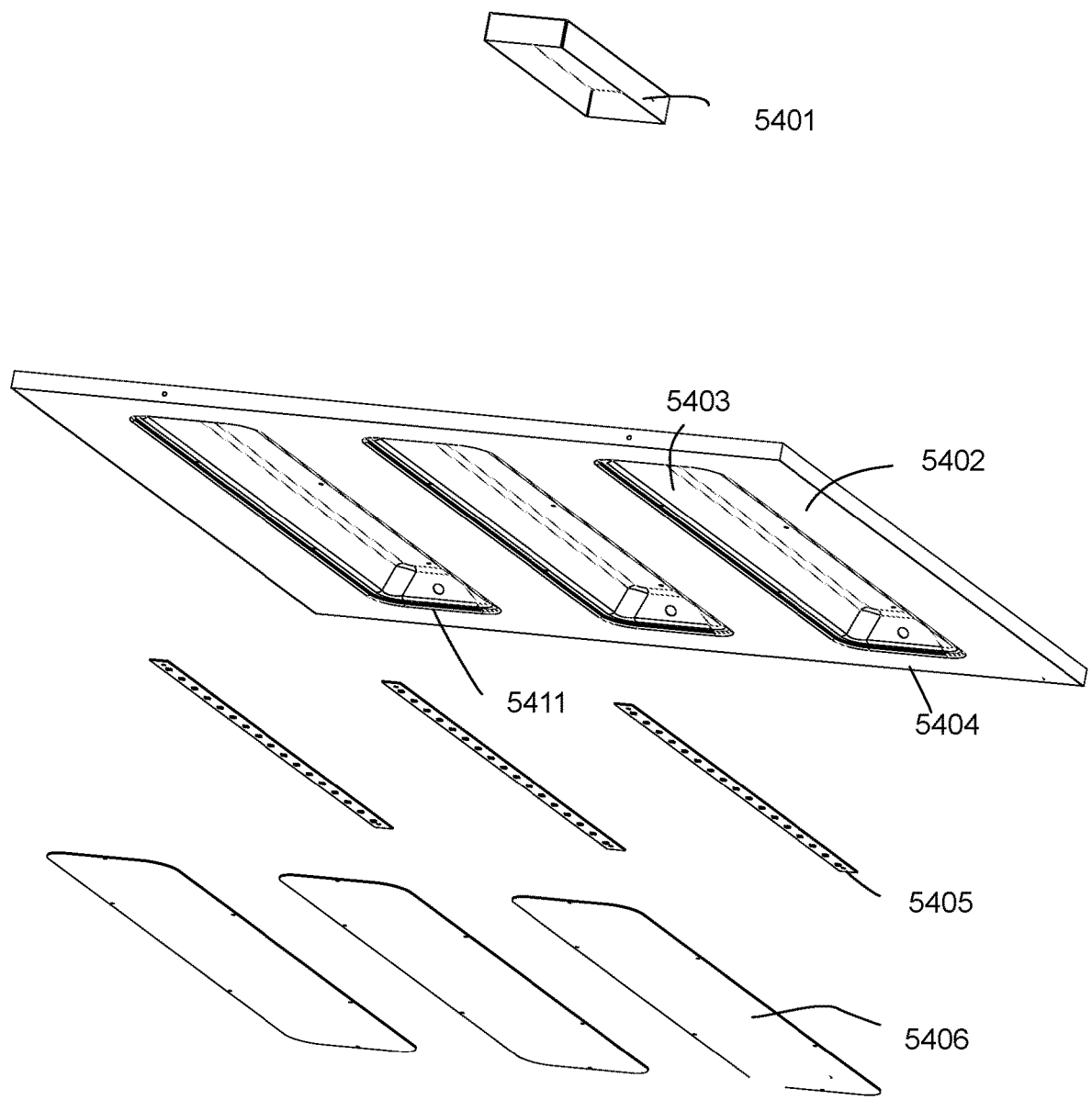

Please refer to FIG. 25, a panel light apparatus includes a back plate 5501, multiple light source modules 5514 and a light passing cover 5509.

The back plate 5501 has a flat area 5502 and multiple concave areas 5503. The concave areas 5503 help increase strength for anti-deforming of the back plate 5501. This is particularly helpful when the back plate has a size larger than 60 cm square.

In this example, screws 5507 are used for connecting components. There is a driver box 5508 disposed on a back side of the panel light apparatus. Specifically, the panel light apparatus has a frame 5511. There is a L shape area formed by a back side of the frame 5511 and a lateral wall 5504 of the back plate 5501. The L shape area has a obtuse angle for expanding a luminance area of the light source modules 5514 with reflection and outward angles.

Please refer to FIG. 26A, FIG. 26B, FIG. 26C and FIG. 27. These figures illustrate another embodiment with different views. The panel light apparatus has a back plate 5402. The back plate 5402 has a bottom area 5404 and multiple concave areas 5403. Unlike previous embodiment, this embodiment has separate concave areas 5403. There are elongated light source modules 5405 disposed in the concave areas 5403 separately. These light source modules 5405 may be operated separately so that when one light source module is damaged, other light source modules may still function normally. In other words, the light source module 5405 may be replaced separately. There are multiple light passing covers 5406 separately prepared for the multiple concave areas 5403.

The multiple light source modules are disposed on the bottom plate. Each light source module includes multiple LED modules. Each LED module includes multiple LED devices and multiple corresponding lens. Each LED device is covered by one corresponding lens. The light passing cover is connected to the back plate for enclosing and protecting the light source modules. The lens may diffuse the light of the LED module or condense the light of the LED module. For the former case, the light is evenly projected on the light passing cover. For the latter case, the light is focused as light beams to be transmitted with a condensed intensity to certain projected area.

Figure 28:
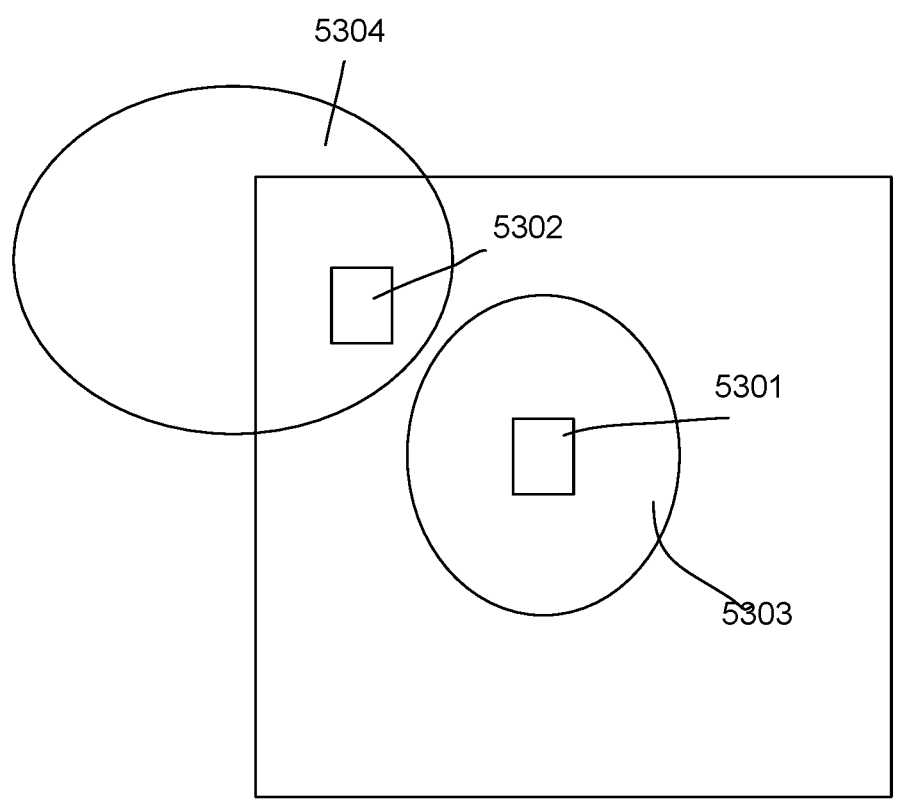
FIG. 28 show different lens with different divergence patterns are placed at different positions of a panel light.

In FIG. 28, there are two lens disposed on light source modules at different positions on the back plate. Specifically, the first lens 5301 diverges light of a corresponding LED device mainly to a first area 5303 centered with the lens 5301. The second lens 5302, placed in a peripheral area, mainly diverges the light of a corresponding LED device an area 5304 not centered at the lens 5302. Under different requirements, lens at different positions are placed with lens with different parameters of light directing to further enhance desired luminance effect.

In other words, when there are multiple light source modules disposed at different areas of the panel light apparatus, the lens for different light source modules may be designed with different directing parameters. For example, the lens for light source modules on a peripheral area, compared with the lens in the middle area, help diverges the light of the light source module to a wider area to more evenly projecting light on a luminance area.

In some embodiments, the back plate has four lateral walls and a bottom plate. An internal surface of the lateral wall has an obtuse angle against an inner surface of the bottom plate.

In some embodiments, the light passing cover is a diffusion plate. A peripheral edge of the diffusion plate is enclosed by a frame. The frame clips the diffusion plate between the frame and the back plate.

In some embodiments, the panel light apparatus may also include a driver box disposed on a L shape area of a back side of the frame and an exterior side of the lateral wall. The L shape area has an obtuse angle.

In some embodiments, there is a manual switch disposed on a front side of the frame for a user to operate the manual switch for adjusting a setting of the light source module.

In some embodiments, the manual switch is selected to adjust an intensity of the light source module for fitting to different emergency needs of time.

In some embodiments, an antenna unit is disposed on a front side of the frame, an electrode of the antenna unit is provided for connecting to a wireless circuit.

In some embodiments, each concave area is disposed with one corresponding light source. There are multiple light passing covers separately connected to the back plate for forming multiple container spaces.

In some embodiments, the light source module is an elongated shape light bar. The concave area is an elongated concave area.

In some embodiments, the lights source module is disposed at a bottom position of the concave area. Two side walls of the concave areas reflect a light of the light source to the light passing cover.

In some embodiments, the multiple light sources are working separately. When one of the multiple light sources is damaged, the other light sources are still working normally.

In some embodiments, the concave area has a plugging unit for the light source module to plug for a structure and an electrical connection.

In some embodiments, the light source module is a standard light tube.

In some embodiments, the light passing cover has an outwardly curved surface forming a light passing dome for expanding a luminance area.

In some embodiments, the lens has an exterior surface and an internal surface, a top part of the exterior surface has a central concave portion and a convex ring portion surrounding the central concave portion. The internal surface conceals an LED IC of the LED device preventing contact with environment air, and there is a heat dissipation air in the concealed space for protecting the LED IC.

Figure 11:
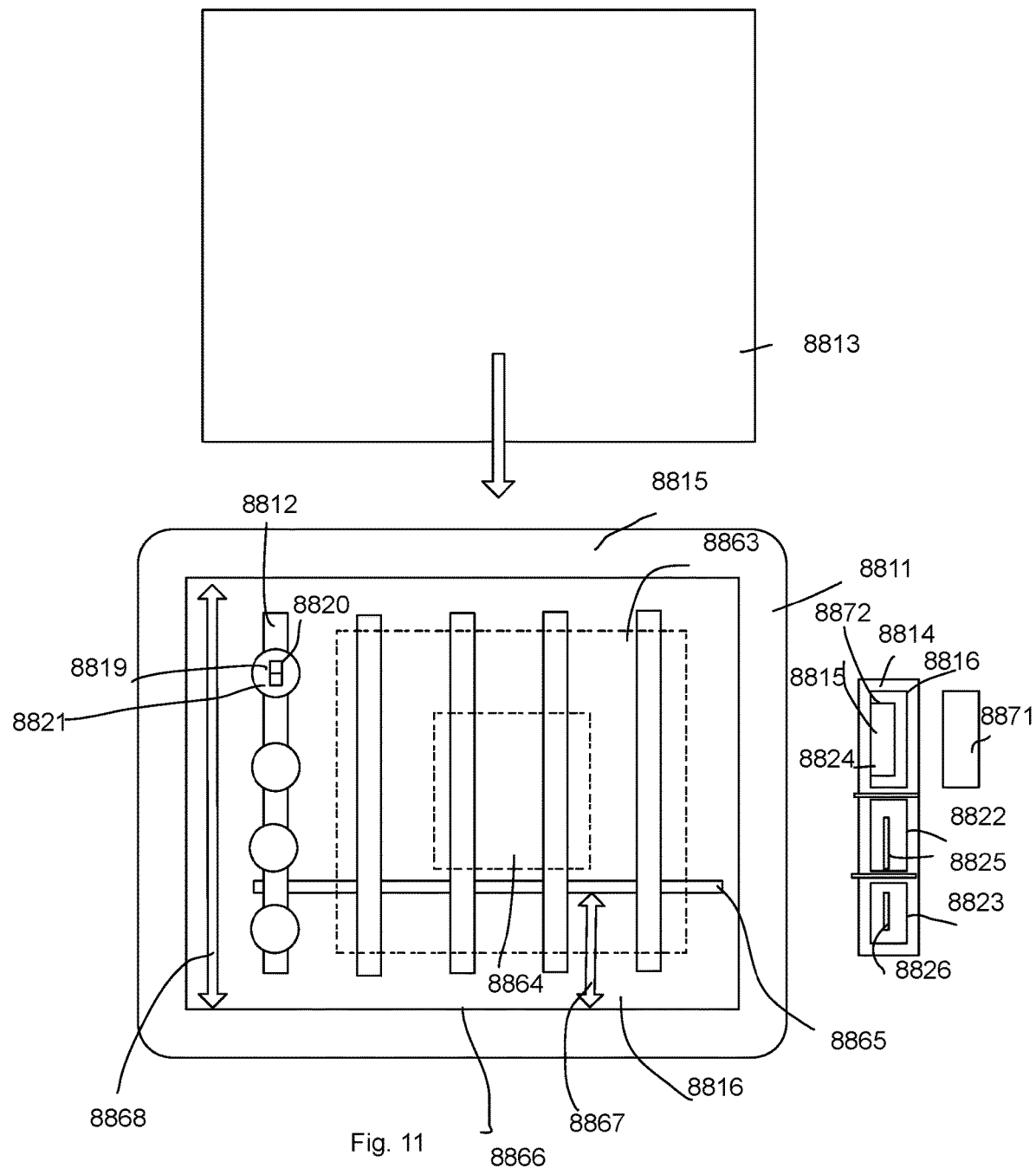
FIG. 11 shows a structure diagram of a panel light apparatus.

In FIG. 11, a panel light apparatus including a back plate 8811, a light source module 8811, a diffusion plate 8813, a driver module 8815 and a driver cover 8814. The back plate 8811 has four lateral walls 8815 and a bottom plate 8816.

Figure 12:
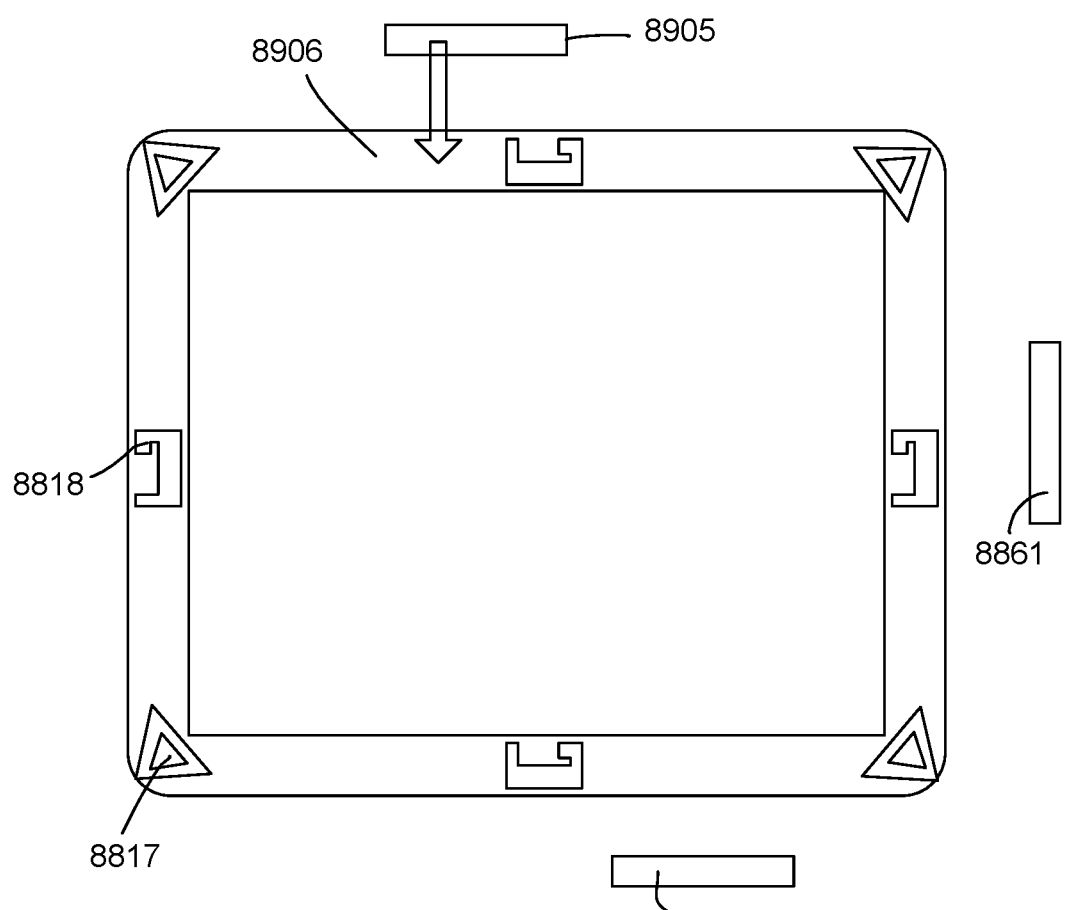
FIG. 12 shows a back view of an example with multiple sets of folding hooks.

In FIG. 12, A back side of the bottom plate includes multiple sets of folding hooks 8817 and 8818. In FIG. 12, the first set of hooks include triangle folding hooks 8817 on four corners. The second set of hooks include four L-shape hooks 8818 that may be folded to extend from surface of the back plate.

Each set corresponds a different installation platform. One of the multiple sets of folding hooks is folded to be used for hooking to a corresponding installation platform.

In FIG. 11, a light source module 8812 has multiple LED modules 8819 disposed on the bottom plate 8816. Each LED module 8819 has a LED device 8820 and a lens 8821. The lens 8821 diffuses a light of the LED device 8820 to be evenly emitted from the lens 8821 and broadening an output angle of the light via the lens 8821.

The diffusion plate 8813 with a peripheral edge is fixed to the four lateral walls 8815 of the back plate 8811. The driver cover 8814 is attached to an external side of one of the four walls 8815 of the back plate 8811. The driver cover 8811 defines a container cavity 8816 for concealing the driver module 8815.

The driver cover 8814 has a driver opening 8872 for exposing the driver module 8819 to manually adjusting the driver module 8819.

In some embodiments, the driver opening 8872 is covered by a movable driver concealing plate 8871. The movable driver concealing plate 8871 is moved to expose the driver module 8819 to be manually adjusted.

Figure 22A:
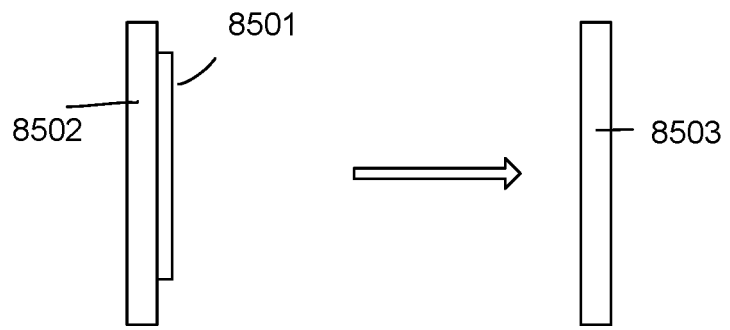
FIG. 22A shows a scrollable film example.
Figure 22B:
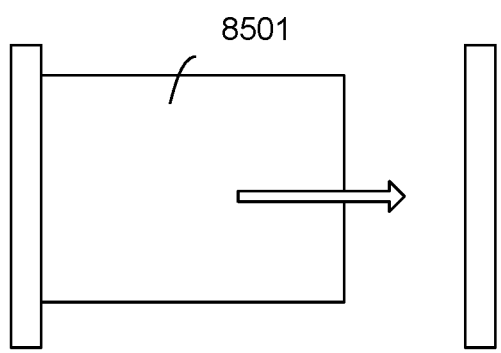
FIG. 22B shows another status of the example of FIG. 22A.
Figure 22C:
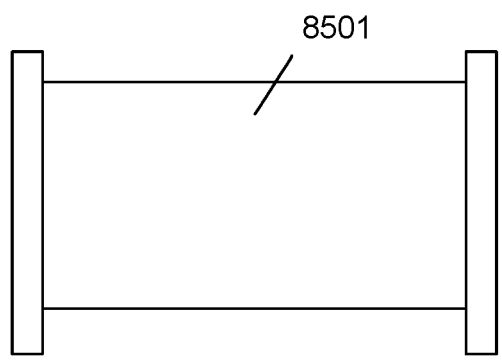
FIG. 22C shows another status of the example of FIG. 22A.

In FIG. 22A, FIG. 22B and FIG. 22C, a scrollable film 8501 is manually added above the diffusion plate. The scrollable film 8501 is collected in a frame 8502 while not being used. In such status like FIG. 22A, the light is passing through a diffusion plate directly. When users want a soft light, users may pull the scrollable film 8501 toward the frame 8503 like FIG. 22B and FIG. 22C.

In some embodiments, the diffusion plate has a detachable diffusion film. The detachable diffusion film is replaceable with another detachable diffusion film to provide different light output effect. For example, the scrollable film 8501 illustrated in FIG. 22A may be a film with attached peripheral structure, like buckle or magnetic unit for fixing to the frame. Users may select diffusion effect or even color what they want to replace with.

In some embodiments, the LED modules are divided into multiple LED sets like that illustrated in FIG. 11. When one LED set is damaged, an adjacent LED set is activated to replace the damaged LED set. For example, adjacent LED strips may be set as a backup pair. When one adjacent LED strip is damaged, the backup LED strip may be activated while previously, the backup LED strip is kept not used. The driver module may wake up the backup LED strip automatically. The driver module may have a manual switch or receive an external command via a wireless interface to switch the backup LED strip.

In some embodiments, a driver circuit is concealed by the back plate and the diffusion plate. In FIG. 11, the driver circuit 8701 is placed in the same side as the LED modules in the back plate.

Figure 23:
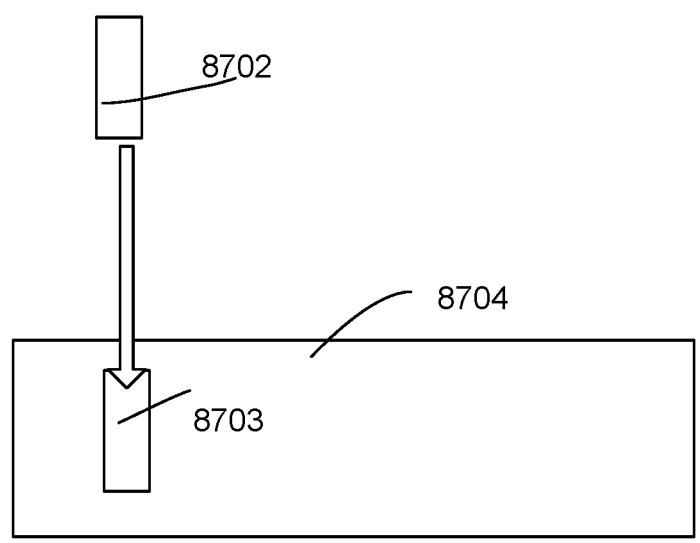
FIG. 23 shows a function slot for plugging a function module.

In FIG. 23, the driver cover 8704 has a module slot 8703 for inserting a function module 8702. The function module 8702 may have a corresponding component placed on a frame, e.g. an antenna or a speaker hole or a sensor.

In some embodiments, the multiple LED modules are divided into different tilt groups with different emitting angles with respect to the diffusion plate to evenly produce an even light on the diffusion plate.

Figure 24:
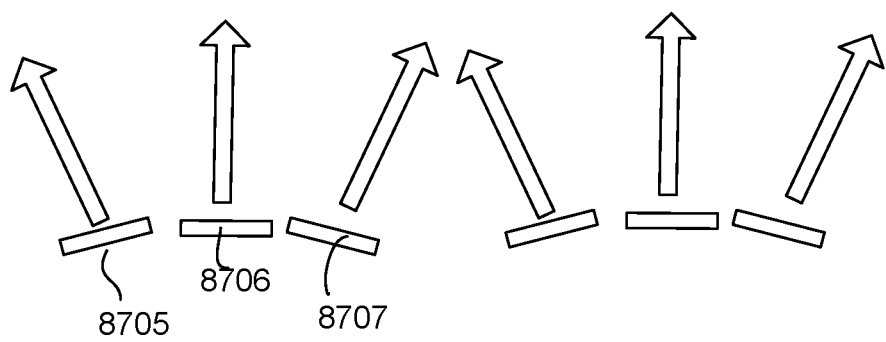
FIG. 24 shows LED modules are disposed with different tilt angles.

For example, in FIG. 24, three LED modules 8705, 8706, 8707 are disposed with different tilt angles with respect to the horizontal surface of the back plate. By adjusting intensities of lights from these LED modules and tilt angles of these LED modules, the diffusion effect may be further enhanced or the lens may be reduced for saving cost.

In some embodiments, the panel light apparatus has a wire terminal. The wire terminal having a tilt receiver side with a tilt angle with respect to the driver circuit board. The wire terminal includes an insulation body, a receiver socket and an electrode. The receiver socket has a tilt angle between 10 degrees to 80 degrees with respect to the driver circuit board. The receiver socket is used for connecting to a wire plug for electrically transmitting an external power to the driver circuit board via the electrode and the driver wire. An example may be found in FIG. 7 and FIG. 10. There is an acute tilt angle 8802 for a tilt surface of the receiver socket with respect to the horizontal surface of the circuit board of the driver module.

In some embodiments, the driver cover includes a support plate for mounting a driver circuit board of the driver module. The support plate holds the driver circuit board to keep a distance to a bottom surface, e.g. an exterior surface of the back plate, thus reserve an air passing tunnel for air to flow through.

In some embodiments, a heat dissipation channel is below the support plate and the back plate for air flowing carrying away heat of the driver module.

In some embodiments, the driver cover has a heat dissipation opening for air to pass through for carrying away heat of the driver module. This further enhances the feature when air carrying heat may be moved outside the driver cover.

Figure 15:
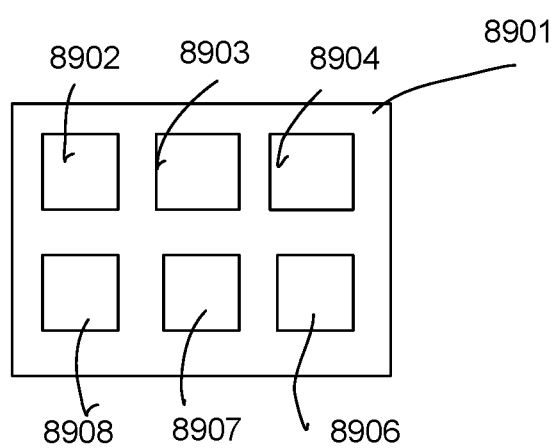
FIG. 15 shows a LED module having multiple LED dies.

In FIG. 15, a LED device 8901 may has multiple LED dies with different optical parameters. For example, the LED device 8901 includes a first white LED die 8902, a second white LED die 8903, a red LED die 8904, a green LED die 8906, a blue LED die 8907 and a third white LED die 8908. A LED die is a semiconductor unit cut from a semiconductor waver for performing a designed task, i.e. to emit light when receiving electricity. The driver module controls these LED dies with different optical parameters to mix desired optical parameter of a final output light. The first white LED die 8903, the second white LED die 8904 and the third LED die 8908 may have different color temperatures so as to mix more color temperatures. The red LED die 8904, the green LED die 8906 and the blue LED die 8907 may be used for mixing a desired color. Other configuration may be applied. For example, the LED dies in this example of FIG. 15 may use the same LED dies but each area is covered with a different fluorescent layer or different fluorescent layers to emit lights of different optical parameters.

Figure 8:
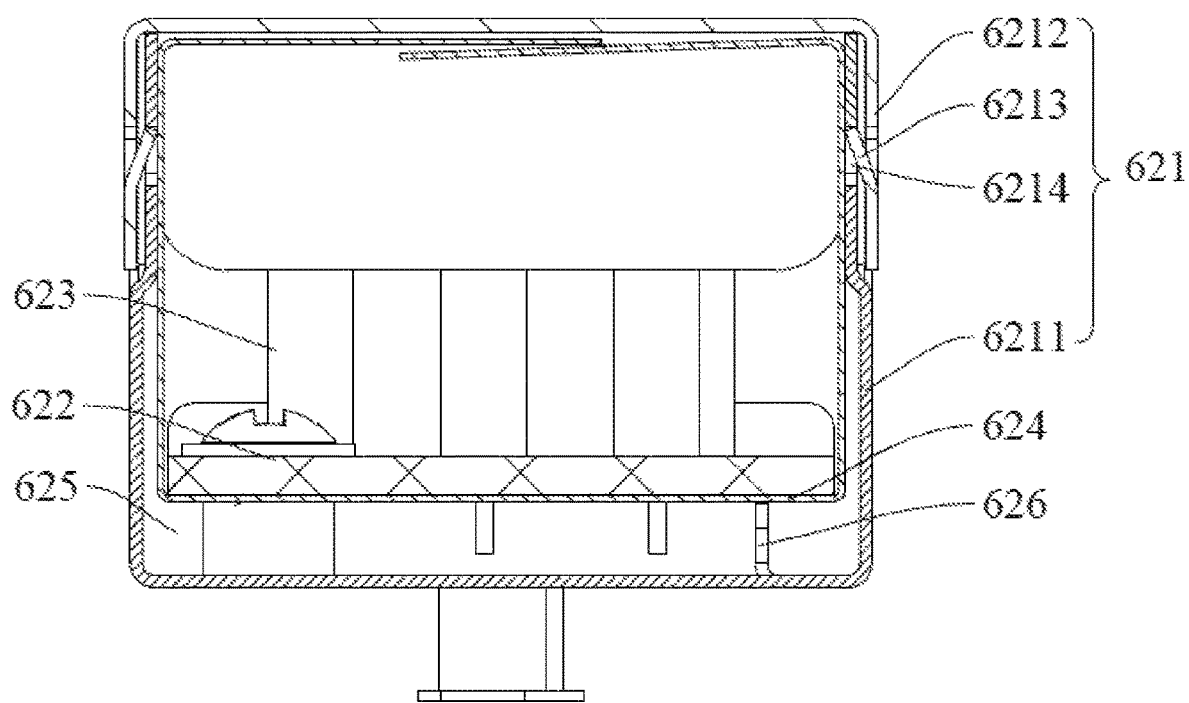
FIG. 8 illustrates a driver cover structure.
Figure 9:
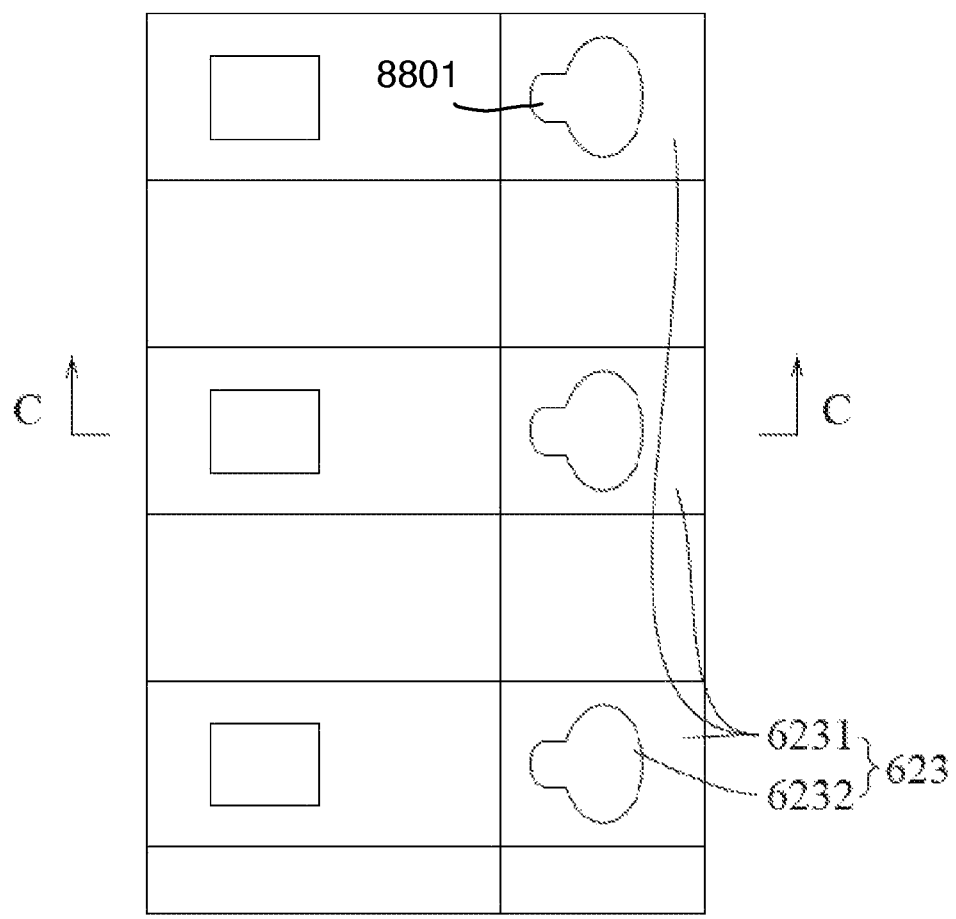
FIG. 9 illustrates a top view of a wire terminal component.

In some embodiments, the driver cover includes a detachable top cover having two top side walls to engages two bottom side walls of the driver cover to define the container cavity. The example that includes a top housing and a bottom housing that are detachably connected for creating the driver cover mentioned in this disclosure support such embodiment. FIG. 8 shows one such example for forming a driver cover with top housing and a bottom housing.

In FIG. 12, a battery 8905 is placed aside an external side of one lateral wall 8906 for providing an emergent current to the LED modules. The emergent current is smaller than a normal driving current provided to the LED modules.

Figure 16:
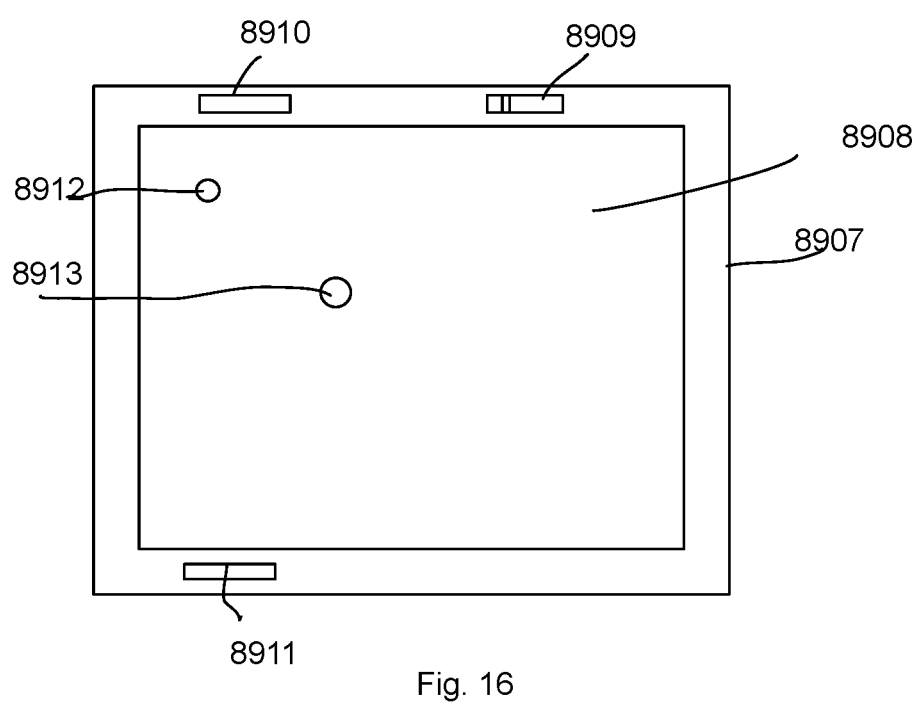
FIG. 16 shows an example with a frame and multiple function slots.

In FIG. 16, the panel light apparatus may also include a frame 8907 surrounding the back cover and the diffusion plate 8908. There is a manual switch 8909 disposed on the frame to configure a setting of the driver module.

In some embodiments, the manual switch is used for changing an optical parameter for controlling the LED modules.

Figure 17:
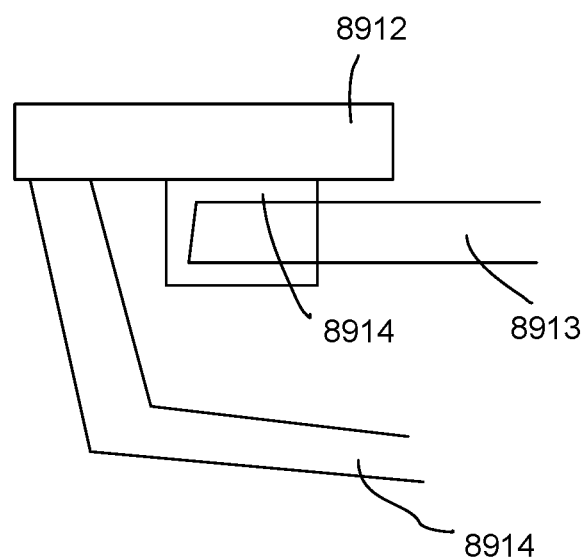
FIG. 17 shows a foam used in a frame of a panel light embodiment.

In FIG. 17, the panel light apparatus may also include a frame 8912 surrounding the back cover 8914. There is a foam 8914 between a connection of the frame 8912 and the diffusion plate 8913.

In FIG. 16, the panel light apparatus may also include a frame 8907 with function slots 8910, 8911 for mounting a function module connecting to the driver module. For example, the function slots 8910, 8911 may be used for attaching a function unit like an antenna, a speaker sound hole, a sensor or other device connected or function independently but only receives power supply from the driver module.

In FIG. 16, the panel light apparatus may also include an indicator 8912 for transmitting a light message on the diffusion plate. The indicator 8912 may be also a LED module integrated with other LED modules or a separate component for providing visual information controlled by the driver module.

In FIG. 16, the panel light apparatus may also include a beam LED module 8913 having a condensing lens for emitting a light beam on the diffusion plate for showing a light message controlled by the driver module. As the examples mentioned below with drawings, the LED modules may be a LED device covered by a lens that diffuses a light of the light device. In some embodiments, some LED modules may be used for a function other than luminance but to provide visual information. In such case, some LED modules that may be controlled separately are covered with a condensing lens for generating a focuses light beam, which may be used as an indicator for transmitting a message, e.g. the status of the panel light apparatus is abnormal, entering an emergency status with a battery, receiving a wireless signal.

In some embodiments, the driver cover 8814 is made of metal material.

In some embodiments, the driver cover 8814 and an exterior surface of one lateral wall 8815 of the back plate together form the container cavity 8816 for concealing the driver module 8815.

In some embodiments, the driver cover 8814 has multiple sections 8824, 8822, 8823. A first section 8824 of the multiple sections is used for containing the driver module 8815. A second section 8822 of the multiple sections is used for connecting a first wire 8825. There is a separator 8827 between the first section 8824 and the second section 8822.

In some embodiments, a third section 8823 of the multiple sections is used for connecting a second wire 8826. A voltage passing the first wire 8825 is larger than a voltage passing the second wire 8826. For example, the first wire 8825 is connected to a 110V or 220V alternating power source. The second wire 8826 is connected to a dimmer switch on a wall with lower voltage.

Figure 21:
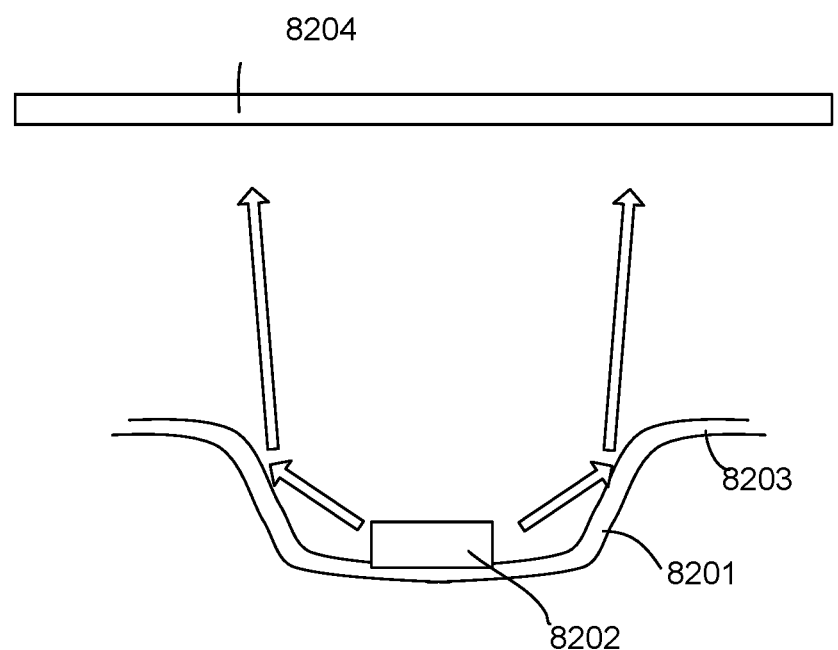
FIG. 21 shows a concave groove for disposing a LED strip.

In FIG. 21, the bottom plate 8202 has multiple curved reflective areas 8201 respectively facing toward the multiple LED modules 8202 for reflecting the light of the multiple LED modules 8202 toward the diffusion plate 8204.

Specifically, in some embodiments, the LED modules mainly rely on diffusion refraction of the lens covered over its LED device. The inner surface of the back plate, particularly when being attached with a reflective layer or a reflective coating, also helps on reflecting a portion of light to the diffusion plate.

In some other embodiments, the concave and convex shapes of the reflective layer surrounding the LED module may be designed particularly for the light paths of the LED modules to more efficiently reflecting to the diffusion layer.

When the panel light apparatus has a larger size, it would be expensive to attach a reflective layer on every position of the back plate. To optimize the balance between cost and light efficiency, areas that reflect more portion, e.g. where more than 70% of light reflection occurs, are attached with reflection strips.

Figure 18A:
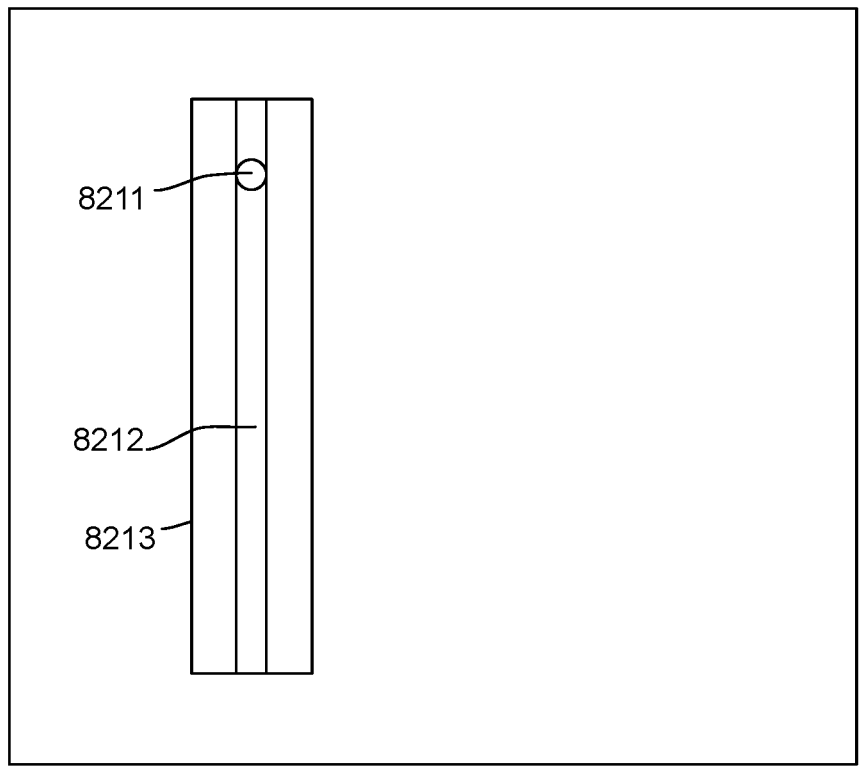
FIG. 18A shows a reflective strip attached to a back plate.
Figure 18B:
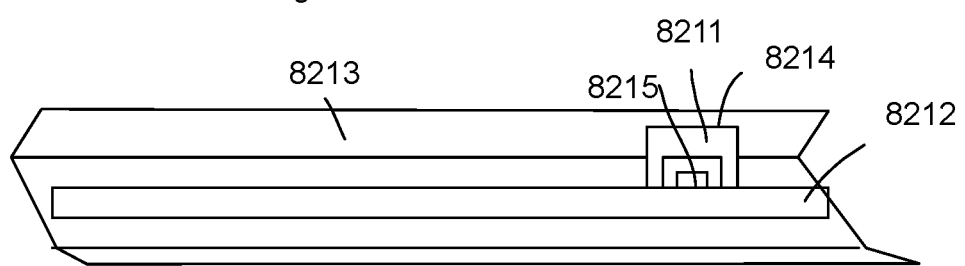
FIG. 18B shows another view of the example in FIG. 18A.

In FIG. 18A and FIG. 18B, the LED modules 8211 are divided into groups and placed on multiple LED strips 8212. There is a lens 8214 covering a LED device 8215 for diffusing light of the LED device 8215 evenly toward the diffusion plate.

In this example, a reflection strip 8213 are attached to the LED strip 8212 as a balance of cost and overall light efficiency.

In some embodiments, the multiple LED modules are divided into multiple LED strips respectively disposed in concave grooves of the bottom plate.

In some embodiments, the bottom plate has another convex groove for placing the driver module. For example, a driver component may be placed within a convex groove as illustrated in the reference numeral curve area 8201. The concave shape provides a container space for storing a component while overall appearance is still elegant.

In some embodiments, the LED strip has a LED circuit board mounted with a portion of the LED modules, the width of the LED circuit board is smaller than a diameter of the lens.

In FIG. 11, the lens 8821 has a larger width than the LED circuit board 8812.

In FIG. 19, the lens 8305 directs a portion of a light of the LED modules 8304 to be reflected by the bottom plate 8303 to the diffusion plate.

In FIG. 19, the lens has a reflection part 8301 for reflecting a portion of the light of the LED module 8304 to the bottom plate 8303 and then to the diffusion plate.

In FIG. 19, the lens has an anti-blue-light layer 8411 for decreasing high frequency light emitting from the diffusion plate. The anti-blue-light layer 8411 may be applied to exterior surface of the lens. In some embodiments, anti-blue-light material may be added to material for building the lens. There are multiple materials for filtering certain blue light or high frequency light to protect human eyes. Since the lens is the key gateway for light to pass through, it would be critical and helpful to add such function to the lens.

Figure 20A:
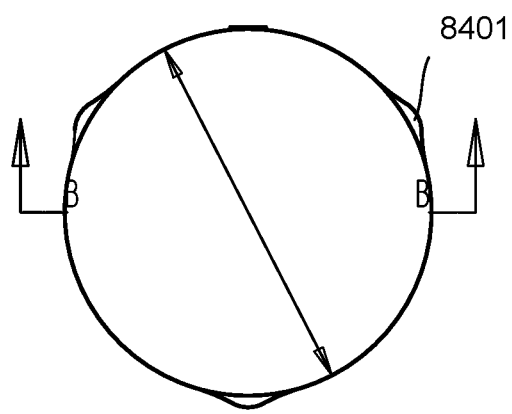
FIG. 20A shows a lens example in a first view.
Figure 20B:
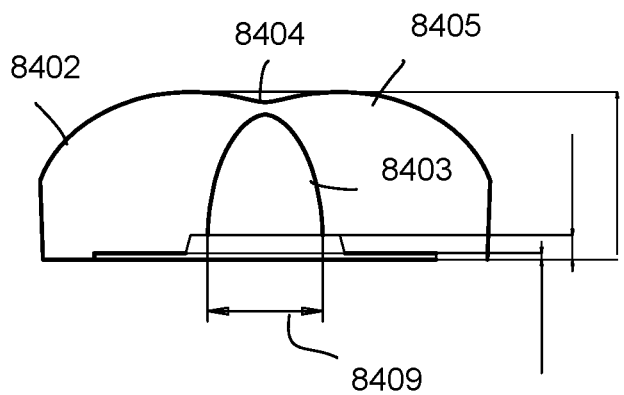
FIG. 20B shows a lens example in a second view.
Figure 20C:
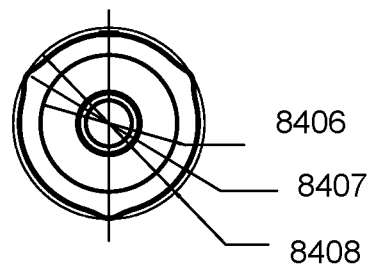
FIG. 20C shows a lens example in a third view.

FIG. 20A, FIG. 20B and FIG. 20C shows different views of a lens example.

In FIG. 20A, the lens has a positioning part 8401 for aligning and attaching to a LED circuit board mounted with the LED modules.

In FIG. 20B, the lens has an exterior surface 8402 and an internal surface 8403. A top part of the exterior surface 8402 has a central concave portion 8404 and a convex ring portion 8405 surrounding the central concave portion 8404.

In some embodiments, the internal surface 8403 of the lens has a dorm shape surrounding the LED device. The diameters of the three borders of the exterior side of the lens are 9.5 mm, 12.5 mm and 13.5 mm. The inner diameter 8409 of the lens is 3 mm. A range of 30% of the size are tested satisfying for a panel light apparatus with 60 cm to 90 cm width. A minimum distance between a top surface of the lens to the diffusion plate is more than 30 mm in tests for getting a nice visual effect.

In FIG. 19, there is an air gap 8410 between the lens and the LED device for preventing heat accumulated between the LED device and the lens.

In some embodiments, the multiple sets of folding hooks are fit to a surface of the back plate.

In FIG. 12, one set of folding hook 8817 of the multiple sets of folding hooks are located at four corners of the back plate.

Figure 13:
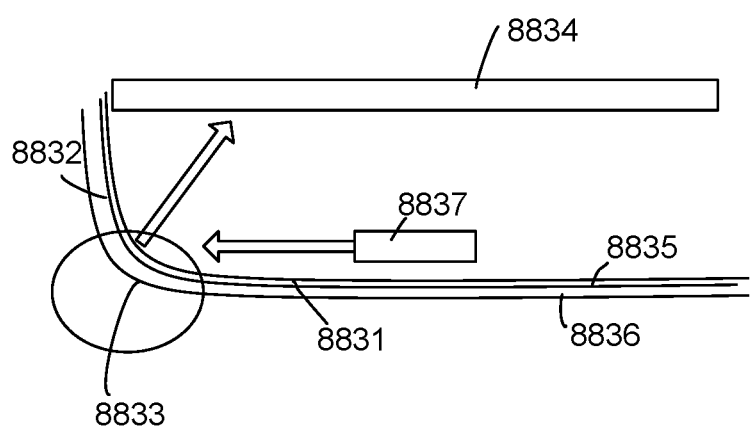
FIG. 13 shows a corner structure of a back plate.

In FIG. 13, a connection edge 8833 between the four lateral walls 8832 and the bottom plate 8831 has a curved reflective area for reflecting the light of the LED modules toward the diffusion plate 8834.

The bottom plate may a metal layer and reflective layer. In some embodiments, the reflective layer is a PET thin film.

In some embodiments, the PET thin film and the metal layer are connected via a heating procedure and then are stamped for forming the four lateral walls and the bottom plate.

In FIG. 13, the bottom plate has a metal layer 8836 and reflective layer 8835. The reflective layer 8836 of the bottom plate help reflecting a light of the multiple LED modules 8837 emitting on the reflective layer 8835 of the bottom plate.

In some embodiments, the bottom plate has multiple curved reflective areas 8833 respectively facing toward the multiple LED modules 8837 for reflecting the light of the multiple LED modules toward the diffusion plate 8835.

Figure 14:
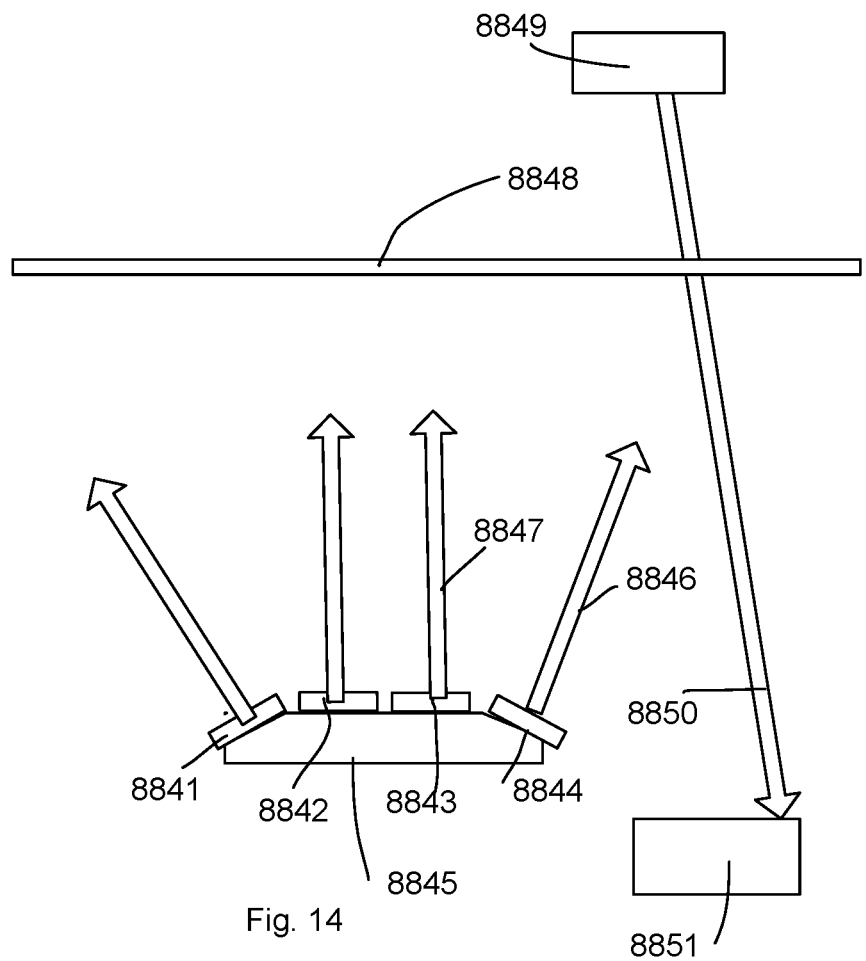
FIG. 14 shows a package with multiple LED devices.

In FIG. 14, the LED module has multiple LED devices 8841, 8842, 8843, 8844 integrated on a package 8845. The multiple LED devices 8841, 8842, 8843, 8844 on the package 8845 are positioned to have different angles for emitting multiple lights from the package 8845. The lens mentioned may still be used for diffusing lights from the LED devices 8841, 8842, 8843, 8844. In some embodiments, if the LED devices are positioned properly, the lens may even be reduced to further saving cost and decrease light waste on passing lens while an evenly distributed light pattern is still obtained.

In some embodiments, the multiple lights 8846, 8847 of the multiple LED devices 8844, 8843 for different angles have different light intensities.

In some embodiments, the light intensities are adjusted by the driver module to provide an overall even output on the diffusion layer 8848. The lights from the LED modules are summed and appear a light pattern on the diffusion layer 8848. By adjusting proper intensities of the LED devices 8844, 8843 for different angles, an even output on the diffusion layer 8848 may be obtained. The effect would be better if lens are used. But, if the LED devices and angles on placing the LED devices are well configured, the lens may be reduced.

In FIG. 14, an external device 8849 captures an output light pattern appeared on the diffusion plate 8848 and sends a message 8850 related to the captured output light pattern to the driver module 8851 to adjust the intensities of the multiple LED devices 8841, 8842, 8843, 8844 in the package 8845. There are multiple packages 8845 for the LED modules and the overall light effect may be carefully configured by the external device 8849. Such adjustment may be performed in a factory and the parameters of the driver module is stored for each type of panel light apparatus. Such configuration may be adjusted by users, e.g. using a phone to capture a light pattern image appearing on the diffusion plate 8848. The image is analyzed by an app of the phone and then the message is transmitted to the driver module 8851 to configure the intensities of LED devices on different tilt angles.

In FIG. 12, the driver module has a first driver part 8861 and a second driver part 8862. When one of the first driver part 8861 and the second driver part 8862 is damaged, the other of the first driver part 8861 and the second driver part 8862 is activated. Compared with the LED modules, the driver module is more complicated and may be damaged more easily. By providing a backup driver component, the overall life span of the panel light apparatus is increased. The switch may be automatic or manually by user, e.g. operating a manual switch.

With two driver parts, the two driver parts may be activated automatically to further increase life span of the driver module. For example, a timer is set for switching use of the two driver parts alternatively. Such design prevents any of the driver part staying in high working temperatures that may cause damages of the driver module.

In FIG. 11, the LED modules are divided into groups to be controlled by the driver module separately to produce different light areas 8863, 8864 as requested by a user. Specifically, different light areas 8863, 8864 may be turned on with different luminance are sizes. People may need soft or small light when they are preparing to get sleep. In such time, they may use a small light area with smaller light intensity instead of decreasing overall intensity of all LED modules. In some other cases, larger light area may be needed.

In some embodiments, the groups correspond to luminance areas of different dimensions.

In FIG. 11, the multiple LED modules are divided and placed on multiple LED strips disposed in parallel as the five light strips in FIG. 11. A conductive path 8865 is placed away from peripheral edge of the bottom plate with a distance 8867 from the peripheral edge 8866 of more than 10% of a width 8868 of the bottom plate. The conductive path 8865 is used for electrically connecting the multiple LED strips to the driver module.

Figure 1:
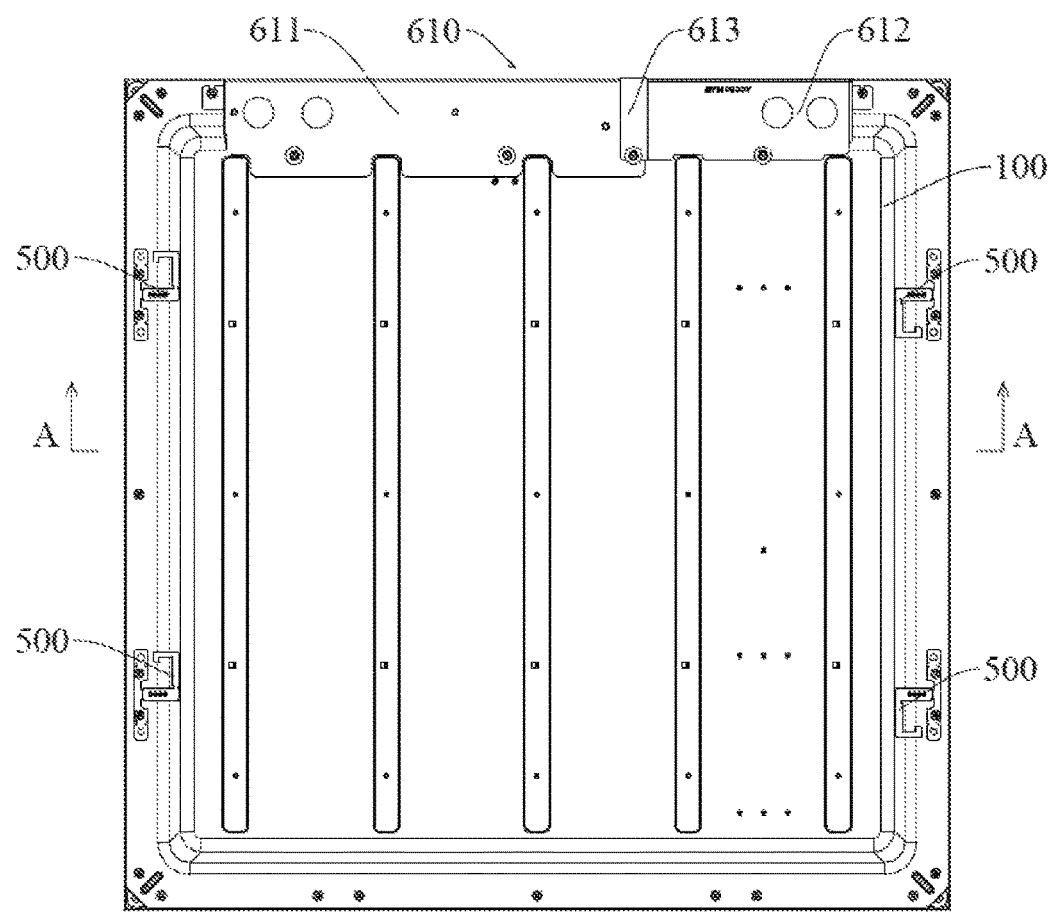
FIG. 1 illustrates an embodiment of a panel light apparatus.
Figure 2:
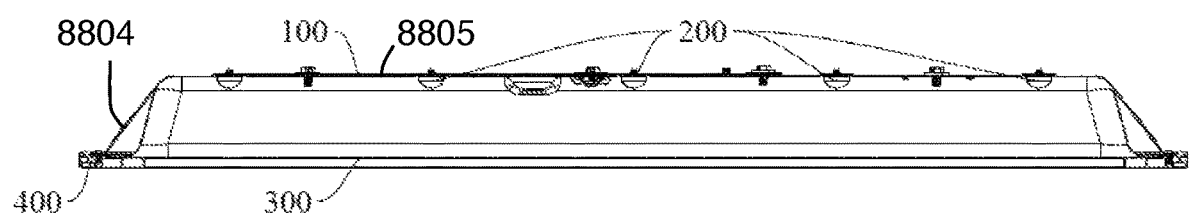
FIG. 2 illustrates a side view of the example in FIG. 1.

Please refer to FIG. 1 and FIG. 2. A panel light apparatus includes a back plate 100. The back plate 100 has a bottom plate 8804 and four lateral walls 8805 extending from and surrounding the back plate 100. The panel light also has a light source module 200 disposed on the bottom plate. The four walls of the base plate are connected to a diffusion plate 300. On the back side of the back plate 100, there are hooks 500 and a driver kit 600.

The diffusion plate 300 is connected to the back plate 100 with fasteners 400. The hooks 500 are used for connecting to an installation platform on a wall or on a ceiling.

The driver kit 600 includes a driver module for converting an external power to a driving current supplied to the light source module 200. The light source module 200 includes multiple LED modules. Each LED module has a LED device and a lens covering the LED device for diffusing a light of the LED module to the diffusion plate 300.

The driver kit 600 includes a driver cover 610 and a driver module 620 stored in a container cavity defined by the driver 610. Specifically, the driver cover 610 is attached to an external side of one of the four lateral walls of the back plate. The driver cover 610 may form a container cavity for storing the driver module 620. In some other embodiments, the driver cover 610 and a portion of the lateral wall of the back cover together form the container cavity.

The driver cover 610 includes a cover housing 611 and a movable driver concealing plate 612. The driver module 620 is disposed on the cover housing 611. The cover housing 611 has a driver opening for exposing the driver module 620. The driver concealing plate 612 is manually detachable from the driver cover 610. When the driver concealing plate 612 is moved, the driver module 620 is exposed so that users may operate on the driver module 620, e.g. to operate a manual switch of the driver module 620. When the driver concealing plate 612 is placed to cover the driver opening, the driver module 620 is concealed by the driver cover 610 and the driver concealing plate 612 to protect the driver module 620 and prevent people getting electric shock.

During installation, the driver module 620 is placed on the cover housing 611 and then the driver housing 611 is buckled to the back plate 100 of the panel light apparatus. The cover housing 611 and the back plate 100 together form a container cavity for storing the driver module 620. The driver concealing plate 612 is installed to conceal the container cavity.

The panel light apparatus is attached to a wall or a ceiling by using the hooks of the panel light apparatus 500 to a screw or other fixing devices. In some embodiments, there are multiple sets of hooks. Each set of hook corresponds to a type of installation platform. For different installation platform, a corresponding hook is selected and folded. Other hooks not selected may be kept flattened and unfolded.

In some embodiments, the driver cover may include module slots for plugging function modules required by the users. For example, a wireless function module may be plugged to the driver cover to add communication function of the panel light apparatus. Specifically, the wireless function module is connected to the driver module to expand the power of the driver module. Other function module examples include speakers, sensors, fire alarm modules, smoke detection modules, and any function modules that expand functions of the panel light apparatus or just receive power supply from the driver module. For example, a Wi-Fi hot spot may be installed for receiving the power supply of the driver module, while not necessary to co-work directly with any other component of the panel light apparatus.

In some embodiments, the driver module is a box with a manual switch on its surface.

There may be one or multiple openings on the driver cover, in addition to the driver opening. For example, the cover housing 611 or the driver concealing plate 612 may have wiring holes for passing a wire so as to connect an external wire to the driver module 620 stored in the driver cover.

Figure 3:
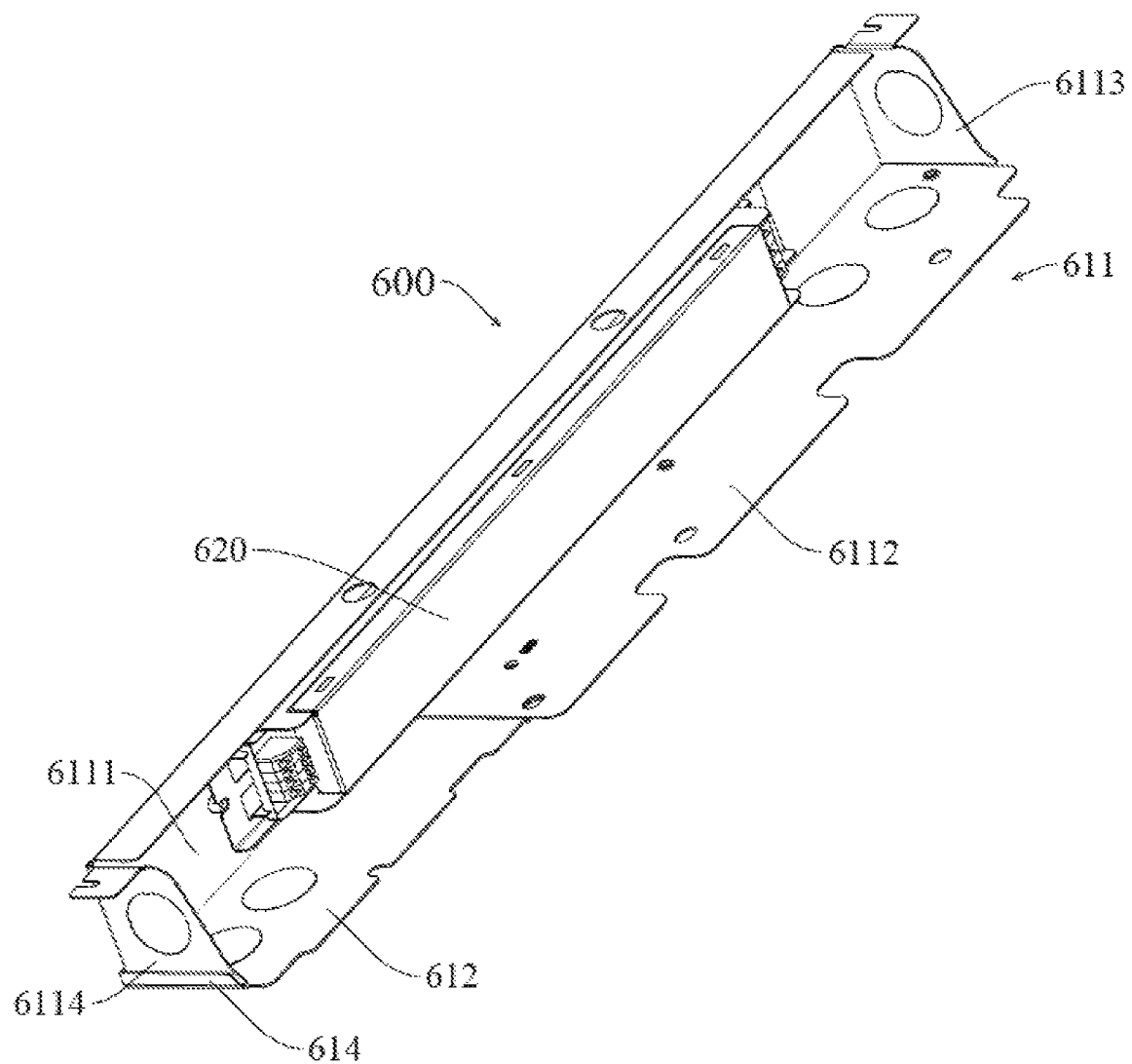
FIG. 3 illustrates a driver kit example.
Figure 4:
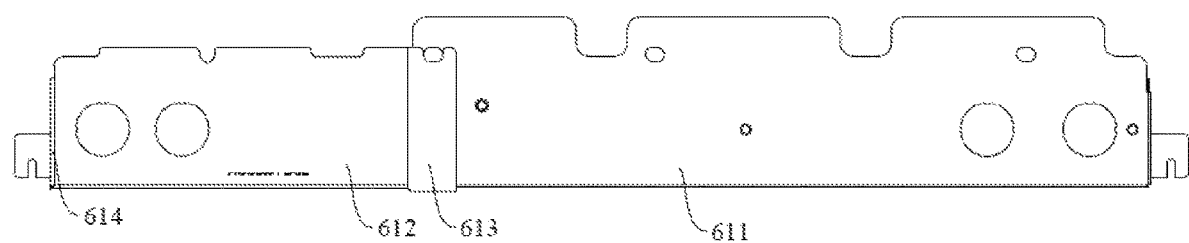
FIG. 4 illustrates a top view of a driver cover.
Figure 5:
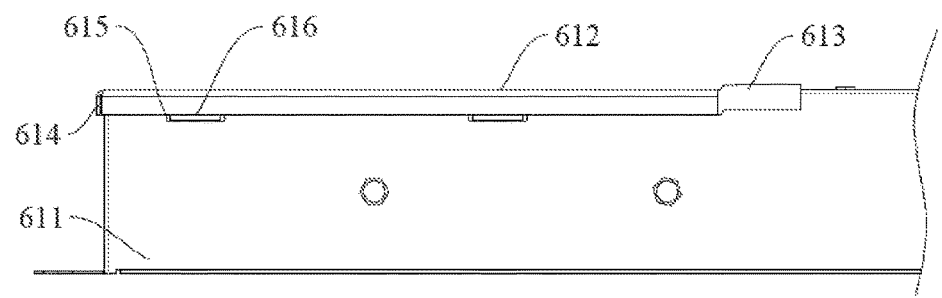
FIG. 5 illustrates another view of the example in FIG. 4.

Please refer to FIG. 3 to FIG. 5. The cover housing 611 includes a support plate 6111 and a top plate 6112 perpendicular to the support plate 6111, and a lateral plate 6113 connecting to the top plate 6112.

The second lateral plate 6114 and the top plate 6112 form an opening. The top plate 6112, the first lateral plate 6113 and the second lateral plate 6114 are disposed at the same side of the support plate 6111 and connected to the support plate 6111.

The top plate 61112 and the second lateral plate 6114 are disposed with a gap forming an opening. Such design reduces a hole stamping operation and increases production efficiency.

The driver 620 is installed on an inner surface of the support plate 6111 to be placed inside a U-shape container cavity. Specifically, the driver concealing plate 612, the top plate 6112, the first lateral plate 6113 and the second lateral plate 6114 together form an U-shape container cavity for storing the driver module 620.

Please refer to FIG. 3 to FIG. 5. The driver concealing plate 612 has a connecting part 613 on the side close to the top plate 6112 for connecting to the top plate 6112. There is a shielding part 614 on the end for shielding plate 612 and the second lateral plate 6114.

The first connecting part 613 implements a connection between the driver concealing plate 612 and the top plate 6112 so that operators may use a screw bolt to connect the first connecting part 613 and the top plate 6112.

The first connecting part 613 shields the gap between the driver concealing plate 612 and the top plate 6112 to prevent dust entering the container cavity to increase the life span of the driver module 620.

In FIG. 3, in some embodiments, the support plate 6111, the top plate 6112, the first lateral plate 6113 and the second lateral plate 6114 are made as a one-piece structure.

In FIG. 4, the first connecting part 613 is connected to the top plate 6112 with a screw bolt. The connecting part 613

Please refer FIG. 5. There is a support plate 6111 connecting to the driver concealing plate 612. There is a first plugging part 615, corresponding to a second plugging part 616.

The first plugging part 615 may be a plugging hole or a plugging groove. The second plugging part 616 may be a corresponding plugging groove or a plugging plate.

Please refer to FIG. 3. The support plate 6111 has a third connecting part detachable connected to the back plate 100. The first lateral plate 6113 and the second lateral plate 6114 respectively have a fourth connecting part for detachably connecting to the back plate 100.

The driver concealing plate 612 has a second connecting part for detachably connecting to the back plate 100. A screw bolt is used for connecting the support plate 6111, the top plate 6112, the first lateral plate 6113, the second lateral plate 6114 and the driver concealing plate 612 to the back plate 100 to fix different portions of the driver cover 610 to the back plate 100.

The third connecting part is integrated as a one-piece structure with the support plate 6111. The first lateral plate 6113 and the second lateral plate 6114 are made as a one-piece structure with the fourth connecting part. The driver concealing plate 612 and the second connecting part are made as a one-piece structure.

Please refer to FIG. 6 to FIG. 10. The driver module 620 includes a housing 21, a circuit board 622 stored in the housing and a wire terminal 623.

The circuit board 622 has two ends extending outside the container cavity formed by the housing 621. The wire terminal 623 is placed outside the container cavity and plugged to fix to the circuit board 622.

The wire terminal 623 includes an insulation body 6231. There is a second plugging hole 6232, as a receiver socket, on the insulation body 6231 for connecting to a wire plug. There is an electrode 6233 electrically connected to a driver wire connected to the circuit board 622. The receiver socket has a tilt angle between 10 degrees to 80 degrees with respect to the driver circuit board 622. There is an acute angle between an axial line of the second plugging hole 6232 and a bottom side of the insulation body 6231.

There is a limiter 8801, which may be an additional hole connecting to the second plugging hole to increase friction between the wire plug and the second plugging hole 6232.

When an external wire is connected to the circuit board 622, the wire plug of the external wire is plugged into the second plugging hole 6232 to electrically contact with the electrode 6233.

Figure 10:
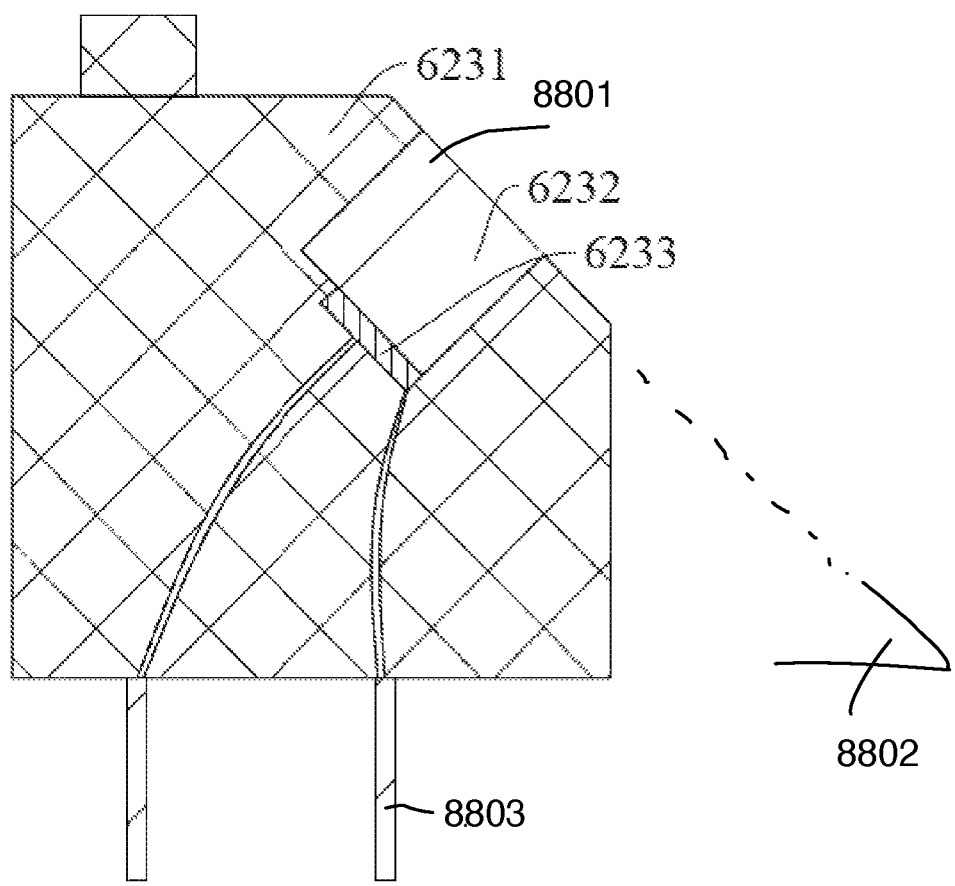
FIG. 10 illustrates a cross-sectional view of a wire terminal component.

Unlike normal plugging hole 6232, which is set horizontally, there is a tilt angle for disposing the second plugging hole 6232 to keep the driver wire and the wire plug not in the same line, but with an angle between 10 degrees to 80 degrees. In FIG. 10, the angle 8802 shows the tilt surface of the receiver socket and the circuit board of the driver module. It would be the same when the angle is taken for considering the axial line of the receiver socket and the circuit board, both with an acute tilt angle with respect to driver wire 8803 of the driver module.

Such design prevents an undesired disconnection or damage when the wire plug is removed from the second plugging hole 6232.

The housing 621 protects the circuit board 622, decreases dust collecting on the circuit board 622 that may cause certain risk. The wire terminal 623 is placed in the container cavity of the housing 621 for the wire plug easily connecting or disconnecting from the wire terminal 623.

Figure 7:
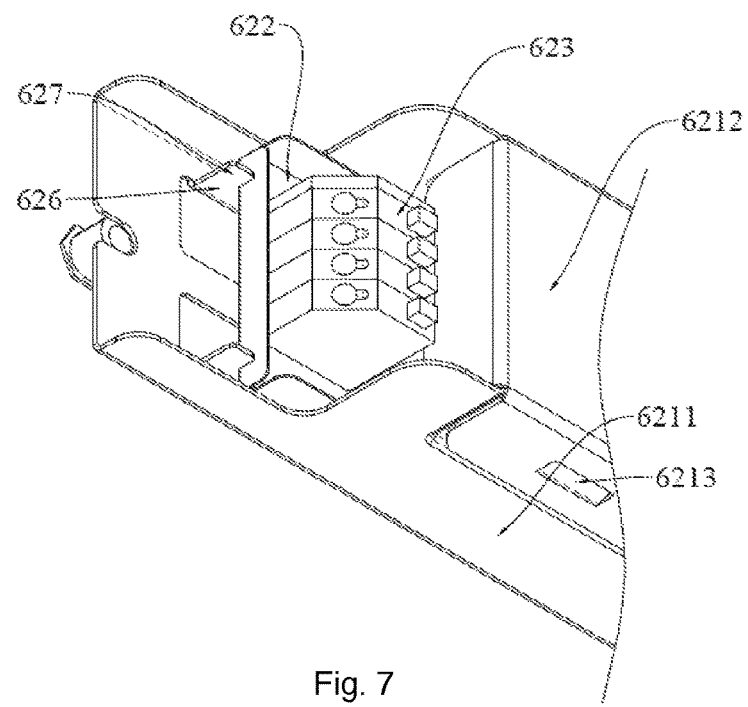
FIG. 7 illustrates a zoom-up view of a wire terminal.

Please refer to FIG. 7 and FIG. 8. The housing 621 includes a bottom housing 6211 below the circuit board 622 and a detachably connecting top housing 6212 connected to the bottom housing 6211. The top housing 6212 and the bottom housing 6211 together form the container cavity for storing the driver module.

The detachable connection between the top housing 6212 and the bottom housing 6211 is convenient for assembly and decreases manufacturing cost.

Specifically, the bottom housing 6211 has a longer length than the length of the circuit board 622. The wire terminal 623 is located outside the container cavity defined by the top housing 6212 and the bottom housing 6211. The second plugging hole 6232, as the receiver socket, is facing outwardly.

Specifically, there is a buckle 6213 on the top housing 6212. There is a container groove 6214 disposed on the bottom housing 6211 corresponding to the buckle 6213.

The bottom of the buckle 6213 is connected to the top housing 6212. The top side is an active end. When the top housing 6212 and the bottom housing 6211 are buckled, the active end of the buckle 6213 is shrunk toward lateral wall direction of the top housing 6212 to enters the container groove 6214 to complete the buckling connection.

There is a hand-held portion disposed on the external wall of the buckle 6213. The hand-held portion is extended outside the top housing 6212. When the top housing 6212 needs to be detached from the bottom housing 6211, the hand-held portion may be pulled outwardly for escaping the buckle 6213 from the container groove 6214. Then, the top housing 6212 is pulled upwardly to detach from the bottom housing 6211.

Please refer to FIG. 8. The driver module 620 also includes a support plate 624. The support plate 624 is disposed in the container cavity. The circuit board 622 is disposed on the support plate 624. The support plate 624 has a bottom surface in parallel with a surface of the bottom housing 6211 forming a heat dissipation channel 625.

The support plate 624 provides a heat dissipation channel 625 so that heat of the driver circuit of the driver module is carried away by air flowing in the heat dissipation channel 625.

Figure 6:
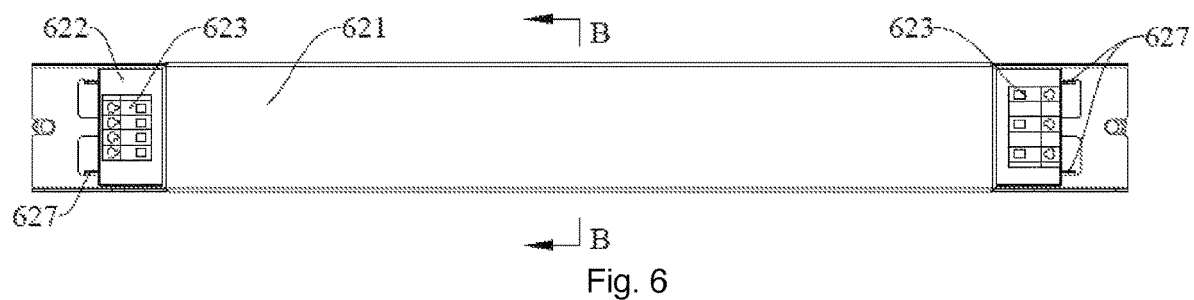
FIG. 6 illustrates a driver module with wire terminals.

Please refer to FIG. 6 to FIG. 8. Two ends of the bottom housing 6211 have support pieces 626 for supporting the support plate 624.

There is a stop block 627 on an external wall of the support piece 626. The two stop blocks 627 respectively disposed on two ends of the bottom housing 6211 are used for clipping the support plate 624.

In FIG. 8, the circuit board 622, the support plate 624 and the bottom plate of the bottom housing 6211 may be detachably connected with a screw bolt.

The screw bolt increases a connection stability of the circuit board 622, the support plate 624 and the bottom housing 6211.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:
1. A panel light apparatus, comprising:
a back plate having a flat area and multiple concave areas;
multiple light source modules disposed on the bottom plate, each light source module comprising multiple

LED modules, each LED module comprising multiple LED devices and multiple corresponding lens, each LED device being covered by one corresponding lens; and a light passing cover for connected to the back plate for enclosing and protecting the light source modules, wherein the back plate has four lateral walls and a bottom plate, an internal surface of the lateral wall has a obtuse angle against an inner surface of the bottom plate, wherein the light passing cover is a diffusion plate, a peripheral edge of the diffusion plate is enclosed by a frame, the frame clips the diffusion plate between the frame and the back plate, wherein the light passing cover is a diffusion plate, a peripheral edge of the diffusion plate is enclosed by a frame, the frame clips the diffusion plate between the frame and the back plate; and a driver box disposed on a L shape area of a back side of the frame and an exterior side of the lateral wall, the L shape area has an obtuse angle.

2. The panel light apparatus of claim 1, wherein there is a manual switch disposed on a front side of the frame for a user to operate the manual switch for adjusting a setting of the light source module.

3. The panel light apparatus of claim 2, wherein the manual switch is selected to adjust an intensity of the light source module for fitting to different emergency needs of time.

4. The panel light apparatus of claim 1, wherein an antenna unit is disposed on a front side of the frame, an electrode of the antenna unit is provided for connecting to a wireless circuit.

5. The panel light apparatus of claim 1, wherein each concave area is disposed with one corresponding light source, and there are multiple light passing covers separately connected to the back plate for forming multiple container spaces.

6. The panel light apparatus of claim 5, wherein the light source module is an elongated shape light bar, and the concave area is an elongated concave area.

7. The panel light apparatus of claim 6, wherein the lights source module is disposed at a bottom position of the concave area and two side walls of the concave areas reflects a light of the light source to the light passing cover.

8. The panel light apparatus of claim 6, wherein the multiple light sources are working separately and when one of the multiple light sources is damaged, the other light sources are still working normally.

9. The panel light apparatus of claim 5, wherein the concave area has a plugging unit for the light source module to plug for a structure and an electrical connection.

10. The panel light apparatus of claim 9, wherein the light source module is a standard light tube.

11. The panel light apparatus of claim 1, wherein the light passing cover has an outwardly curved surface forming a light passing dome for expanding a luminance area.

12. The panel light apparatus of claim 1, wherein the lens has an anti-blue-light layer for decreasing high frequency light emitting from the diffusion plate.

13. The panel light apparatus of claim 1, wherein the lens has an exterior surface and an internal surface, a top part of the exterior surface has a central concave portion and a convex ring portion surrounding the central concave portion.

14. The panel light apparatus of claim 13, wherein the internal surface conceals an LED IC of the LED device preventing contact with environment air, and there is a heat dissipation air in the concealed space for protecting the LED IC.

15. The panel light apparatus of claim 1, wherein the LED module has multiple LED devices integrated on a package, the multiple LED devices on the package are positioned to have different angles for emitting multiple lights from the package.

16. The panel light apparatus of claim 15, wherein the multiple lights of the multiple LED devices for different angles have different light intensities.

17. The panel light apparatus of claim 15, wherein the light intensities are adjusted by the driver module to provide an overall even output on the diffusion layer.

\* \* \* \* \*